US010681599B2

(12) United States Patent
Da Silva et al.

(10) Patent No.: US 10,681,599 B2
(45) Date of Patent: Jun. 9, 2020

(54) ACTIVE MODE MOBILITY MEASUREMENT SIGNAL CONFIGURATION

(71) Applicant: TELEFONAKTIEBOLAGET LM ERICSSON (PUBL), Stockholm (SE)

(72) Inventors: Icaro L. J. Da Silva, Solna (SE); Andreas Reial, Malmö (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 11 days.

(21) Appl. No.: 16/216,281

(22) Filed: Dec. 11, 2018

(65) Prior Publication Data

US 2019/0116530 A1 Apr. 18, 2019

Related U.S. Application Data

(63) Continuation of application No. PCT/IB2017/057106, filed on Nov. 14, 2017.
(Continued)

(51) Int. Cl.
*H04J 3/00* (2006.01)
*H04W 36/00* (2009.01)
*H04B 17/309* (2015.01)
*H04B 7/06* (2006.01)
*H04J 11/00* (2006.01)
*H04L 5/00* (2006.01)
(Continued)

(52) U.S. Cl.
CPC ...... *H04W 36/0085* (2018.08); *H04B 7/0626* (2013.01); *H04B 17/309* (2015.01); *H04J 11/0073* (2013.01); *H04J 11/0076* (2013.01); *H04L 5/0048* (2013.01); *H04W 24/10* (2013.01); *H04W 36/0094* (2013.01); *H04W 16/28* (2013.01); *H04W 72/046* (2013.01)

(58) Field of Classification Search
CPC .............. H04W 36/0085; H04W 24/10; H04B 17/309; H04B 7/0626; H04J 11/0073; H04J 11/0076; H04L 5/0048
See application file for complete search history.

(56) References Cited

U.S. PATENT DOCUMENTS

2016/0174091 A1* 6/2016 Zhang ............... H04W 36/0094
370/252
2016/0345216 A1* 11/2016 Kishiyama ........ H04W 36/0083
(Continued)

OTHER PUBLICATIONS

Translated document of JP 2016-170057 dated Aug. 31, 2016 (Year: 2016).*
(Continued)

*Primary Examiner* — Maharishi V Khirodhar

(57) ABSTRACT

According to some embodiments, a method for use in a wireless device of performing radio resource management (RRM) measurements for mobility in a wireless network comprises obtaining a measurement configuration for measuring mobility signals in connected mode. The measurement configuration includes a reference signal type. The reference signal type indicates a particular type of reference signal of a plurality of possible reference signal types (e.g., PSS, SSS, DMRS, CSI-RS). The method further comprises configuring the wireless device to measure a reference signal of the indicated type; receiving the reference signal of the indicated type; and measuring the reference signal according to the measurement configuration.

20 Claims, 20 Drawing Sheets

Related U.S. Application Data

(60) Provisional application No. 62/421,695, filed on Nov. 14, 2016.

(51) Int. Cl.
  *H04W 24/10* (2009.01)
  *H04W 16/28* (2009.01)
  *H04W 72/04* (2009.01)

(56) References Cited

U.S. PATENT DOCUMENTS

| | | | | |
|---|---|---|---|---|
| 2017/0111886 A1* | 4/2017 | Kim | .................... | H04W 72/042 |
| 2017/0141894 A1* | 5/2017 | Wei | ...................... | H04B 17/309 |
| 2017/0150487 A1* | 5/2017 | Zhou | ........................ | H04B 7/04 |
| 2018/0103407 A1* | 4/2018 | Nagaraja | ............. | H04W 72/044 |
| 2018/0109302 A1* | 4/2018 | Nagaraja | .................. | H04B 7/08 |
| 2018/0115990 A1* | 4/2018 | Abedini | .............. | H04W 74/006 |
| 2019/0191401 A1* | 6/2019 | Harada | .................. | H04L 27/26 |

OTHER PUBLICATIONS

Alcatel-Lucent, et al., Measurement off cell, R2-141515, 3GPP TSG-RAN WG2 Meeting #85bis, Valencia, Spain, Mar. 31-Apr. 4, 2014.

Ericsson, Enabling beam grouping by UE in mobility RS measurements, R1-1611916, 3GPP TSG-RAN WG1 Meeting #87, Reno, NV, USA, Nov. 14-18, 2016.

Ericsson, RS for beam management, R1-1612346, 3GPP TSG-RAN WG1 #87, Reno, Nevada, Nov. 14-18, 2016.

Ericsson, On NR DL mobility measurement signal design, R1-1611915, 3GPP TSG-RAN WG1 Meeting #87, Reno, NV, USA, Nov. 14-18, 2016.

* cited by examiner

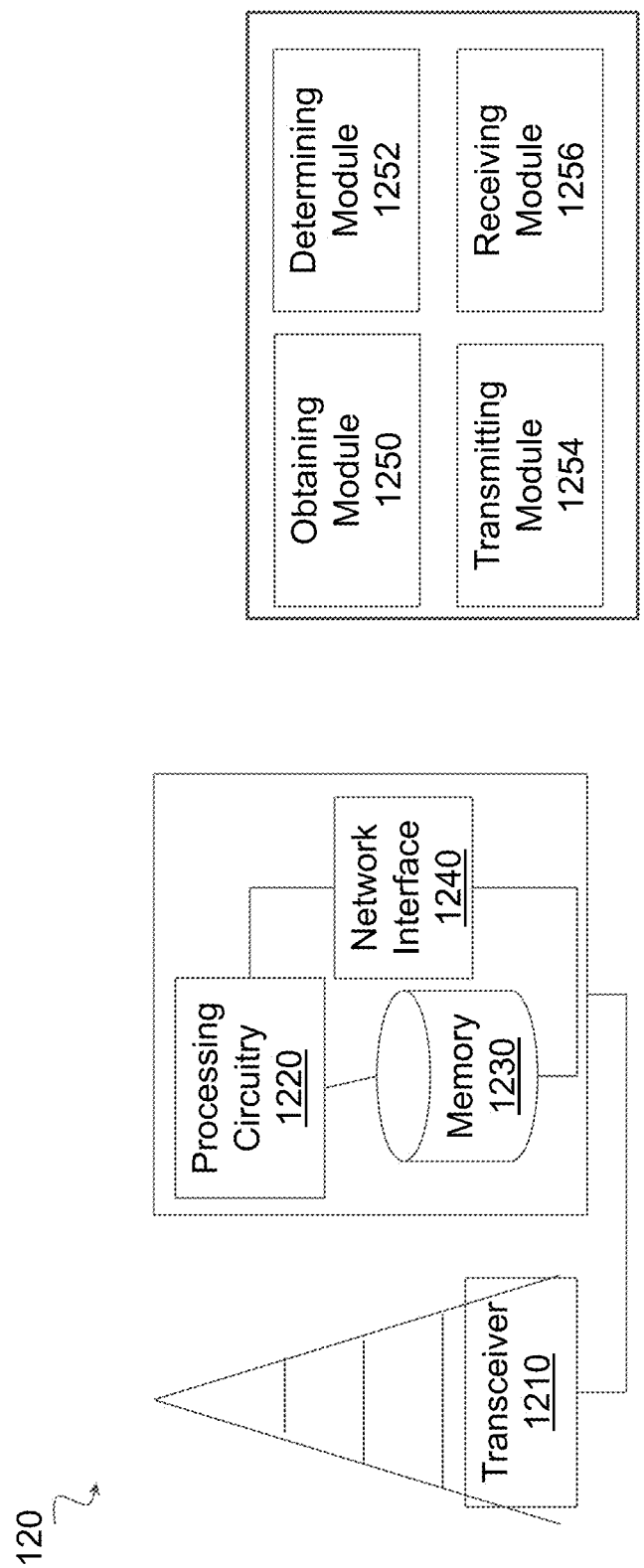

ACTIVE MODE MOBILITY MEASUREMENT SIGNAL CONFIGURATION

RELATED APPLICATIONS

This application is a continuation of International Application No. PCT/IB2017/057106, filed Nov. 14, 2017, which claims the benefit of U.S. Application No. 62/421,695, filed Nov. 14, 2016, the disclosures of which are fully incorporated herein by reference.

TECHNICAL FIELD

Certain embodiments of the present disclosure relate, in general, to wireless communications and, more particularly, to signal configuration for active mode mobility (AMM) measurement.

INTRODUCTION

In a typical wireless, cellular, or radio communications network, wireless devices, also known as mobile stations, terminals, and/or User Equipment (UE), communicate via a Radio-Access Network (RAN) with one or more core networks. The RAN covers a geographical area that is divided into cells. Each cell is served by a base station (e.g., a radio base station (RBS), or network node, which in some networks may also be referred to as, for example, a "NodeB", "eNodeB" or "eNB"). A cell is a geographical area where radio coverage is provided by the radio base station at a base station site or an antenna site in case the antenna and the radio base station are not collocated. One radio base station may serve one or more cells.

When a UE initially connects to a wireless communication system, for example after power-on or when waking up after an extended sleep period, the UE goes through an initial-access procedure. The first step of the procedure is typically that the UE searches for and detects a synchronization signal that is regularly broadcast by the network access nodes. After successful time-frequency alignment, the UE may listen for additional information from the network (e.g., system information) and/or respond with a request to join the network (often referred to as physical random access channel (PRACH) message). The UE is typically not allowed to send the request to join at an arbitrary time, because the request could conflict with other transmissions in the system. Rather, the UE sends the request at a predefined time interval after the downlink signal was received. An example is illustrated in FIG. 1.

FIG. 1 is a block diagram illustrating an example initial access procedure. The horizontal axis represents time. The illustrated example is one possible initial access sequence for 5G. The UE detects a signature sequence (SS) signal 10 that provides at least synchronization, and an associated system information block (MIB) 12 that, together with SS 10, provides essential system information for accessing the system via the PRACH procedure. The received SS+MIB can be used to as an index to retrieve additional system information from an access information table (AIT) 14 or other system broadcast transmission.

Another UE feature may be referred to as idle mode mobility. As an example, the initial access signals may typically also be used by the UE for UE-controlled mobility in idle mode. The UE compares a link quality towards several cells using the SS and possibly other associated signals. If the link quality towards another cell becomes better than the previously best cell, the UE may perform a random access (RA) procedure towards the new cell and register with it for the purposes of, for example, paging signaling. The procedure may be referred to as cell reselection.

Some networks include beam-based systems. Modern cellular systems, e.g., 5G NR systems, may use advanced antenna systems with large antenna arrays for data transmission. With such antenna arrays, data signals may be transmitted in narrow beams to increase signal strength in some directions, and/or to reduce interference in some directions. Using narrow beams may improve link quality, enable spatial separation and reduce interference between users. Using arrays ensures sufficient link quality in high-frequency deployments where the individual antenna element apertures are small and do not capture sufficient signal energy individually. Coherently aligning the elements provides effective beam gain and beam directivity in a certain direction.

Large arrays with beamforming may provide benefits when transmitting data between an access node (AN) and a specific UE, it complicates broadcast system information distribution. In some cases, even if it is possible to configure broad beams from large arrays, the signal strength at the UE may be insufficient and long-term coherent accumulation may be needed. The extent of such accumulation is limited by UE local oscillator (LO) stability and channel coherence time. Therefore, the broadcast info in 5G (AIT, MIB, and SS) may in some cases, at least in higher-frequency deployments, be transmitted using beam sweeping.

Another UE feature may be referred to as active mode mobility. In active mode, the connection of a moving UE is seamlessly handed over as the UE moves across different cell coverage areas in the network. Handover is the process of transferring an ongoing connection of a UE from one node (e.g., serving node) to another node (e.g., target node), or from one cell to another within the same node. Handover provides a transparent service or service continuity over a larger area. The handover should happen without loss of data and preferably with no interruption.

Legacy cell-based systems like long term evolution (LTE) use cell-specific reference signals (CRSs) for mobility measurements. CRS are broadcasted in all neighbor cells in an always-on manner over the entire bandwidth, regardless of the presence or position of UEs in the system. CRS are easy to measure and yield consistent results, but static CRS signaling leads to high resource usage, power consumption and constant inter-cell interference generation in the downlink. All base stations continuously transmit pilot signals that UEs in their own and neighbor cells use to estimate the target cell quality. This is also true in GSM (BCCH), WCDMA (CPICH) and in WiFi (beacon). Each UE performs periodic measurements and reports the measurement results to the network when certain reporting conditions are met (periodic or event based). If it is detected that the serving cell quality is getting close to another candidate cell power, a more detailed measurement process or a handover procedure may be initiated.

In principle, the initial access signals (SS and other associated signals), if transmitted at a sufficient rate, may also be used for active mode mobility measurements. They facilitate estimating the link qualities with respect to the candidate cells, for the purposes of measurement reporting back to the network.

In modern beam based systems, the serving and target node identities are no longer sufficient for maintaining seamless connections during inter-node handover. Handover management between narrow beams in neighboring base stations becomes a necessity, and the serving base station also needs to decide if a beam switch or beam update is necessary within the own cell. The serving link may thus effectively be the beam through which the base station is currently communicating with the UE, and the beam it will hand over or switch to becomes the target link.

In a beam-based system like new radio (NR), avoiding excessive static downlink reference signals is desirable. Instead, the network may turn on mobility reference signals (MRS) in a UE-specific manner only in relevant candidate beams. It is done when the network determines that a beam update for the UE may be needed (e.g., when decreasing serving beam quality is detected). Each activated beam transmits an MRS that contains a timing synchronization component (TSS) whose contents may be common to all beams and a beam identity component (BRS) that carries the beam identity and is beam-specific.

Beam-based systems may use various MRS measurement and reporting strategies. In an LTE-like network, the UE may be continuously monitoring the received sample stream for the presence of MRS. When some event criterion is fulfilled (e.g., any MRS is detected with signal quality exceeding a threshold), the UE may report the received MRS ID and signal quality to the network. The reports may be used for mobility decisions and for building an automatic neighbor relation (ANR) database at a neighbor or beam resolution level.

In an alternative 5G-style network, the network triggers MRS measurements by transmitting a measurement command via control signaling (e.g., when degrading serving link quality or another reason for initiating mobility measurements is identified). The measurement command may contain reporting instructions and, in some cases, an explicit list of MRS to measure. The serving and/or other candidate neighbors reserve uplink resources for receiving measurement reports in the uplink.

In legacy radio access technology (RAT) and network, such as LTE, the active mode mobility (AMM) reference signal and measurement framework is fixed—the same set of signals is used in all deployments and operating scenarios. Following the old model, the new standard could choose, for example, a static mobility reference signal framework that relies on always-on idle mode signals that are transmitted regardless of the presence of the UEs. Such a framework is conceptually simple, but not energy or resource efficient because of constant transmission of all mobility reference signals.

In LTE, for example, cell-specific RSs (CRS) are transmitted in all subframes and across the whole bandwidth. An Idle UE in LTE selects/re-selects an LTE cell based on the CRS for each cell once the UE has detected the PSS/SS encoding the cell ID. Once the UE is in connected state (e.g., after connecting to a cell it was camping on) the UE keeps detecting cells via the same signals as used in idle mode and performs RRM measurements based on the same CRSs also transmitted in the same resources (i.e., all subframes and over the whole band. In summary, an LTE UE, whether in Idle or Connected mode, measures the same reference signals, namely CRSs, to perform RRM measurements transmitted in the same static manner (i.e., in a cell sector).

In beam-based systems such as NR, especially when operating in higher frequencies (HF) (e.g. above 6 GHz), additional problems may exist. In LTE, an Idle UE camps on the best cell, defined by its synchronization signals, PSS/SSS. Upon detecting and synchronizing with the PSS/SSS, the UE knows the cell ID (PCI) and is able to acquire system information and access the cell.

The PSS/SSS in LTE is transmitted every 5 milliseconds (ms). That ensures, for example, that a UE may detect and measure a neighbor cell by searching for PSS/SSSs within an arbitrarily placed time window of 5 ms. However, in case of unlicensed spectrum operation in the 5 GHz band, such frequent transmissions are not allowable at times when the base station does not have any user data to transmit. Similarly, the Small-Cell-On/Off feature introduced in Rel-12 defines Discovery-Reference-Signals (DRS) recurring every 40, 80 or 160 ms that UEs use to detect and measure the cell. Intermediate PSS/SSS occasions are suppressed when UEs are not actively transmitting or receiving data from the cell.

In addition to reduced interference, sparse transmissions may enable the network to apply long discontinuous transmission (DTX) cycles for energy efficiency, which is particularly important for situations with low traffic activity (e.g., 90% of the time in 90% of all cells). NR may include sparse transmission of signals to support idle mode procedures. For example, TR 38.913 (Study on Scenarios and Requirements for Next Generation Access Technologies) contains requirements and design targets related to network energy efficiency for NR. Regarding system information distribution in NR, system information broadcast should allow configurations that enable network efficiency (e.g., by long DTX duration).

Accordingly, the periodicity of signals transmitted primarily to support idle mode procedures should be configurable to allow long DTX durations (e.g., 100 ms). The idle mode synchronization signal 'xSS' is one of the signals (as well as the minimum broadcasted system information). At the same time, idle mode procedures such as cell selection, cell reselection, system information acquisition and initial access should still be able to fulfil NR requirements. Therefore, NR procedures should be designed under the assumption that signals supporting idle mode operation (such as the 'xSS') allow configurations with long DTX cycles (e.g., 100 ms).

In connected mode, some handover scenarios require frequent transmissions of signal(s) to ensure good handover performance to both enable the UE to synchronize with a neighbor cell (unless tightly synchronized with the serving cell), perform RRM measurements and trigger timely measurement reports. In LTE this is achieved by the transmission of the PSS/SSS with a 5 ms periodicity and cell-specific reference signals (CRSs) transmitted in all subframes.

An NR UE in connected mode, as in LTE, also needs to synchronize with a neighbor TRP/cell, perform RRM measurements and trigger timely measurement reports to support RRC driven mobility. In connected mode, the concern of network energy efficiency is not the same as in the previously described case because the presence of active UEs will cause the network to disable the long DTX cycles. Therefore, transmission of a reference signal to support RRC driven mobility can be more frequent than the xSS, assuming these are different signals. The connected mode synchronization signals ('RS') may need to be more frequently transmitted.

Another property in LTE is that a connected UE is able to detect neighbor cells in the same carrier frequency as the serving cell if the SINR of PSS/SSS/CRSs of the serving and neighbor cells are in the UE's receiver's dynamic range. An additional requirement is that the data transmissions of the serving and neighbor cells must be within the dynamic range not to hide the reference signals that the UE intends to measure. In LTE, this is the case because data channels are not subject to massive beamforming and thus their SINR is similar as that of the PSS/SSS/CRSs. In LTE, a UE is able to detect and perform measurements of neighbor cells at the same time it can decode data/control channels.

NR may enable full use of advanced antennas supporting both analog and digital beamforming (to provide extended coverage, increased cell-edge throughput, and improved capacity). Therefore, data channels of UEs in active mode may always be transmitted with high gain beamforming, especially in the high frequency deployments. To enable simultaneous reception of the data signal and the synchronization signal, they must be received at the UE with similar powers. To be more precise, the received power of both signals must fall inside the dynamic range of the UE receiver. An example is illustrated in FIG. 2.

FIG. 2 is a chart illustrating received power of a data signal and a synchronization signal within the dynamic range of a UE receiver. The vertical axis represents received power. In NR, when data/control channels are beamformed, the reference signal used to support RRC driven mobility (i.e., to provide synch and enable RRM measurements) shall also be beamformed.

In summary, network energy efficiency benefits from the sparse transmission of signals supporting idle operation, such as synchronization signals (e.g., PSS/SSS). Neighbor detection to perform RRM measurements to support handovers benefits from beamforming of the reference signal (for RRC driven mobility).

One possible proposal for NR is that when beamforming is needed in connected mode, also use beamforming in idle mode. For example, when high gain beamforming needs to be used for signals in connected mode (e.g., when data channels are also beamforming) and to avoid defining transmission gaps where the UE is only configured to perform measurements (like in compressed mode in UTRAN), the reference signals (connected), the signals supporting idle mode operation, and the system information should also use beam sweeping in the same way to solve the problem of RRC driven mobility.

The problem with the proposal is that it increases the system information overhead (per beam and transmitted in many narrow beams) and disables further enhancements in terms of energy efficiency (e.g., via SFN transmissions of system information for the sake of enabling a proper RRC driven mobility solution). In order words, the concerns cannot be separated. If more beams need to be configured for mobility, then the same number needs to be configured for initial access, even though the requirements may be completely different. In idle mode, signals could be swept in longer intervals and wider beams to improve PRACH coverage, while in connected mode, more granular beams may be needed.

Another proposal is to use different reference signals in idle and connected modes so that the reference signals can be beamformed differently and with different periodicity. For example, the proposal may define a reference signal for RRM measurements to support connected mode operation (e.g., handovers) as an additional signal to the signals supporting idle mode operation (such as synchronization signals PSS/SSS), only transmitted when active UEs need to be served. By doing so, the network is able to adjust the periodicity of signals supporting idle and connected mode operations independently, and benefit from different beam configuration of signals supporting idle and connected mode operations. For example, it enables single-beam transmissions of physical broadcast channel (PBCH) carrying minimum system information (used in idle mode) while also enabling multi-beam transmission for the reference signal used for RRM measurements in connected mode to support RRC based mobility.

The proposal enables the possibility to address the dynamic range issue by transmitting reference signals used by connected UES in a multi-beam manner while transmitting the signals supporting idle mode in a single-beam manner (enabling the possibility of SFN transmissions to reduce system information overhead).

The additional beamformed reference signals (often referred to herein as mobility reference signals (MRSs)) may encode at least a beam ID that a UE may use to perform RRM measurements over multiple occasions of the same, to report to a serving TRP the RRM measurements per beam, and to enable the serving TRP to send a handover command associated to a specific beam that the UE can connect to. Some examples are illustrated in FIGS. 3-6

FIG. 3 is a block diagram of single beam transmission of xSS and system information. The horizontal axis represents time. In the illustrated example, a single beam synchronization signal 16 is transmitted at an interval of 100 ms.

FIG. 4 is a block diagram of single beam transmission of xSS and system information, and beam sweeping transmission of mobility reference signals. The illustrated example is similar to FIG. 3, except that in areas that include active UEs, beam sweeping is used to transmit mobility reference signals 18.

FIG. 5 is a block diagram illustrating beam sweeping transmission of xSS and system information. The illustrated example is similar to FIG. 3, except that synchronization signal 16 is transmitted using beam sweeping.

FIG. 6 is a block diagram illustrating beam sweeping transmission of xSS and system information and mobility reference signals. The illustrated example is similar to FIG. 4, except that synchronization signal 16 is transmitted using beam sweeping. The beam sweeping configuration may be different for synchronizations signals 16 and mobility reference signals 18.

Despite its flexibility, a drawback of the proposal is that it introduces additional reference signals to be used for RRM measurements for connected mode UEs, which represents an additional overhead to signals used to support idle mode operations (e.g., PSS/SSS). In addition, the new signals are introduced so that they can be beamformed with high gain and/or be transmitted more often. However, in some scenarios the PSS/SSS periodicity is quite frequent (e.g., in small cells, where long DTX does not save so much energy). In other scenarios, the beamforming gain to the UE is not very high so that wide beams could be detected and used for performing RRM measurements while the UE is in connected mode. There are also scenarios that even with high gain beamforming the bursty nature of UE traffic may facilitate usage of transmission beamforming gaps even for intra-frequency RRM measurements.

In 5G networks such as NR, the range of different deployments is broad—it covers the frequency range from 1-100 GHz and a range of deployments from rural macro networks to UDNs. The wide range of mobility scenarios and number of UEs per cell, among other things, determines whether a certain AMM is efficient and how it performs. A single and fixed AMM approach will not provide optimal AMM performance in all deployments and scenarios. There is thus a need for a more flexible approach for selecting an AMM reference signal and measurement framework to ensure efficiency and performance.

SUMMARY

According to some embodiments, a method for use in a wireless device of performing radio resource management (RRM) measurements for mobility in a wireless network comprises obtaining a measurement configuration for measuring mobility signals in connected mode. The measurement configuration includes a reference signal type. The reference signal type indicates a particular type of reference signal of a plurality of possible reference signal types (e.g., PSS, SSS, DMRS, CSI-RS). The method further comprises configuring the wireless device to measure a reference signal of the indicated type; receiving the reference signal of the indicated type; and measuring the reference signal according to the measurement configuration.

In particular embodiments, the plurality of possible reference signal types includes active mode mobility signals (MRS) and idle mode synchronization signals. The MRS may include a channel state indicator reference signal (CSI-RS). The idle mode synchronization signals may include at least one of a primary synchronization signal (PSS), a secondary synchronization signal (SSS), and a demodulation reference signal (DMRS).

In particular embodiments, the measurement configuration includes a configuration for non-beamformed or wide-beam reception of the idle mode synchronization signals. The measurement configuration may include a configuration for beam-swept reception of the idle mode synchronization signals. The measurement configuration may include a configuration for beam-swept reception of the MRS. The MRS may comprises a beam identifier and/or a cell identifier.

In particular embodiments, the method further comprises: sending a measurement report based on the received reference signal to a network node; and performing a handover. The method may comprise obtaining a second measurement configuration for measuring mobility signals in connected mode. The second measurement configuration includes a second reference signal type. The second reference signal type indicates a particular type of reference signal of the plurality of possible reference signal types. The method may further comprise configuring the wireless device to measure a reference signal of the second indicated reference signal type; receiving the reference signal of the second indicated reference signal type; and measuring the reference signal according to the second measurement configuration.

According to some embodiments, a wireless device is capable of performing RRM measurements for mobility in a wireless network. The wireless device comprises processing circuitry operable to obtain a measurement configuration for measuring mobility signals in connected mode. The measurement configuration includes a reference signal type. The reference signal type indicates a particular type of reference signal of a plurality of possible reference signal types. The processing circuitry is further operable to configure the wireless device to measure a reference signal of the indicated reference signal type; receive the reference signal of the indicated reference signal type; and measure the reference signal according to the measurement configuration.

In particular embodiments, the plurality of possible reference signal types includes active mode MRS and idle mode synchronization signals. The MRS may include a CSI-RS. The idle mode synchronization signals may include at least one of a PSS, a SSS, and a DMRS.

In particular embodiments, the measurement configuration may include a configuration for non-beamformed or wide-beam reception of the idle mode synchronization signals. The measurement configuration includes a configuration for beam-swept reception of the idle mode synchronization signals. The measurement configuration may include a configuration for beam-swept reception of the MRS. The MRS may comprise a beam identifier and/or a cell identifier.

In particular embodiments, the processing circuitry is further operable to send a measurement report based on the received reference signal to a network node, and perform a handover. The processing circuitry may be further operable to obtain a second measurement configuration for measuring mobility signals in connected mode. The second measurement configuration includes a second reference signal type. The second reference signal type indicates a particular type of reference signal of the plurality of possible reference signal types. The processing circuitry is further operable to: configure the wireless device to measure a reference signal of the second indicated reference signal type; receive the reference signal of the second indicated reference signal type; and measure the reference signal according to the second measurement configuration.

According to some embodiments, a method for use in a network node of configuring a wireless device to measure reference signals for mobility in a wireless network comprises obtaining a measurement configuration for measuring mobility signals in connected mode. The measurement configuration includes a reference signal type. The reference signal type indicates a particular type of reference signal of a plurality of possible reference signal types. The method further comprises transmitting the measurement configuration to a wireless device, and transmitting the reference signal of the indicated reference signal type.

In particular embodiments, the plurality of possible reference signal types includes active mode MRS and idle mode synchronization signals. The MRS may include a CSI-RS. The idle mode synchronization signals may include at least one of a PSS, a SSS, and a DMRS.

In particular embodiments, the measurement configuration may include a configuration for non-beamformed or wide-beam reception of the idle mode synchronization signals. The measurement configuration includes a configuration for beam-swept reception of the idle mode synchronization signals. The measurement configuration may include a configuration for beam-swept reception of the MRS. The MRS may comprise a beam identifier and/or a cell identifier.

In particular embodiments, the method further comprises receiving a measurement report from the wireless device, and performing a handover for the wireless device. The method may further comprise obtaining a second measurement configuration for measuring mobility signals in connected mode. The second measurement configuration includes a second reference signal type. The second reference signal type indicates a particular type of reference signal of the plurality of possible reference signal types. The method further comprises transmitting the second measurement configuration to a wireless device, and transmitting a second reference signal of the second indicated reference signal type.

According to some embodiments, a network node is capable of configuring a wireless device to measure reference signals for mobility in a wireless network. The network node comprises processing circuitry operable to obtain a measurement configuration for measuring mobility signals in connected mode. The measurement configuration includes a reference signal type. The reference signal type indicates a particular type of reference signal of a plurality of possible reference signal types. The processing circuitry is further operable to transmit the measurement configuration to a wireless device, and transmit the reference signal of the indicated reference signal type.

In particular embodiments, the plurality of possible reference signal types includes active mode MRS and idle mode synchronization signals. The MRS may include a CSI-RS. The idle mode synchronization signals may include at least one of a PSS, a SSS, and a DMRS.

In particular embodiments, the measurement configuration may include a configuration for non-beamformed or wide-beam reception of the idle mode synchronization signals. The measurement configuration includes a configuration for beam-swept reception of the idle mode synchronization signals. The measurement configuration may include a configuration for beam-swept reception of the MRS. The MRS may comprise a beam identifier and/or a cell identifier.

In particular embodiments, the processing circuitry is further operable to receive a measurement report from the wireless device, and perform a handover for the wireless device. The processing circuitry is further operable to obtain a second measurement configuration for measuring mobility signals in connected mode. The second measurement configuration includes a second reference signal type. The second reference signal type indicates a particular type of reference signal of the plurality of possible reference signal types. The processing circuitry is further operable to transmit the second measurement configuration to a wireless device, and transmit a second reference signal of the second indicated reference signal type.

According to some embodiments, a wireless device is capable of performing RRM measurements for mobility in a wireless network. The wireless device comprises an obtaining module, a receiving module, and a measuring module. The obtaining module is operable to obtain a measurement configuration for measuring mobility signals in connected mode. The measurement configuration includes a reference signal type. The reference signal type indicates a particular type of reference signal of a plurality of possible reference signal types. The measuring module is operable to configure the wireless device to measure a reference signal of the indicated reference signal type. The receiving module is operable to receive the reference signal of the indicated reference signal type. The measuring module is further operable to measure the reference signal according to the measurement configuration.

According to some embodiments, a network node is capable of configuring a wireless device to measure reference signals for mobility in a wireless network. The network node comprises an obtaining module and a transmitting module. The obtaining module is operable to obtain a measurement configuration for measuring mobility signals in connected mode. The measurement configuration includes a reference signal type. The reference signal type indicates a particular type of reference signal of a plurality of possible reference signal types. The transmitting module is operable to transmit the measurement configuration to a wireless device, and transmit the reference signal of the indicated reference signal type.

Also disclosed is a computer program product. The computer program product comprises instructions stored on non-transient computer-readable media which, when executed by a processor, perform the steps of: obtaining a measurement configuration for measuring mobility signals in connected mode; configuring the wireless device to measure a reference signal of an indicated type; receiving the reference signal of the indicated type; and measuring the reference signal according to the measurement configuration.

Another computer program product comprises instructions stored on non-transient computer-readable media which, when executed by a processor, perform the steps of: obtaining a measurement configuration for measuring mobility signals in connected mode; transmitting the measurement configuration to a wireless device, and transmitting the reference signal of an indicated reference signal type.

Certain embodiments of the present disclosure may provide one or more technical advantages. For example, some embodiments may facilitate configuring active mode mobility (AMM) reference signals (RSs) and measurements, depending on deployment and usage scenario parameters, so that the resource usage is efficient while maintaining a required AMM performance level. Other advantages may be readily available to one having skill in the art. Certain embodiments may have none, some, or all of the recited advantages.

BRIEF DESCRIPTION OF THE DRAWINGS

For a more complete understanding of the embodiments and their features and advantages, reference is now made to the following description, taken in conjunction with the accompanying drawings, in which:

FIG. 19A is a block diagram illustrating an example embodiment of a network node;

FIG. 19B is a block diagram illustrating example components of a network node;

DETAILED DESCRIPTION

Figure 1:
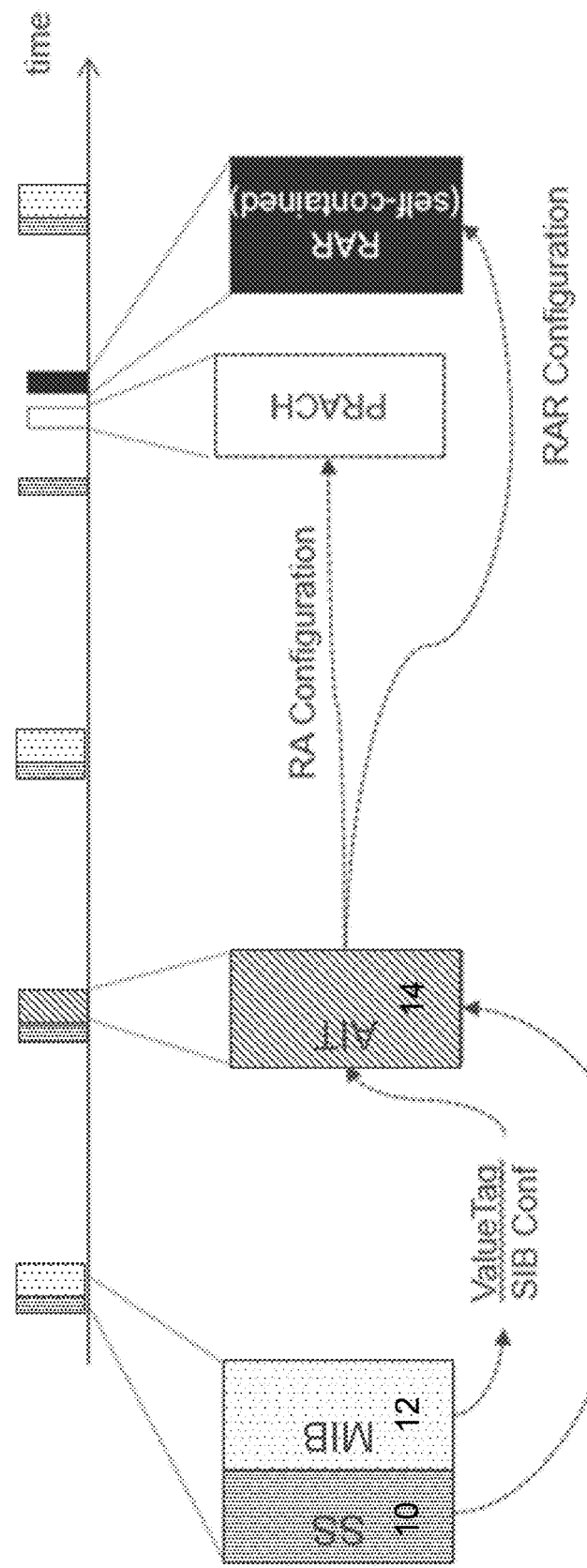
FIG. 1 is a block diagram illustrating an example initial access procedure.
Figure 2:
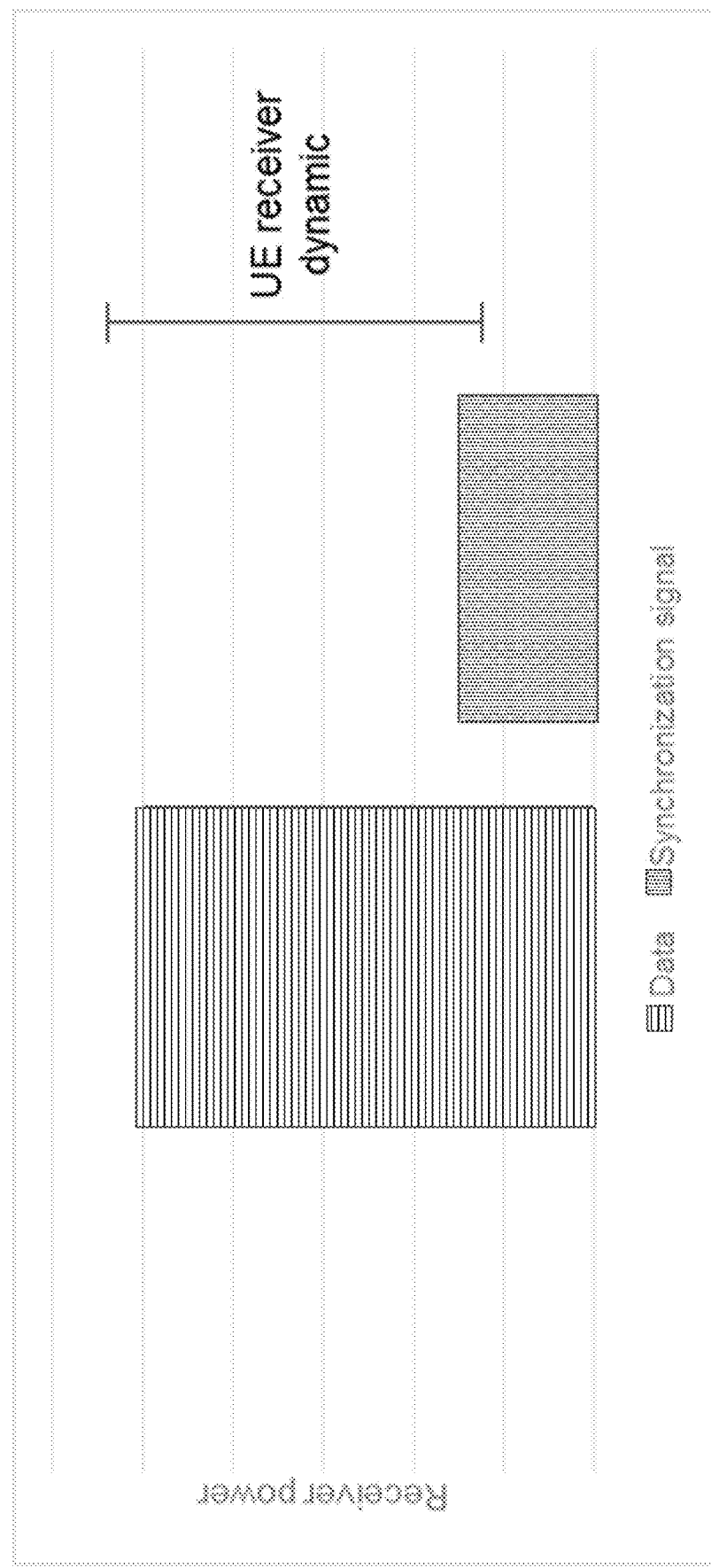
FIG. 2 is a chart illustrating received power of a data signal and a synchronization signal within the dynamic range of a UE receiver.
Figure 3:
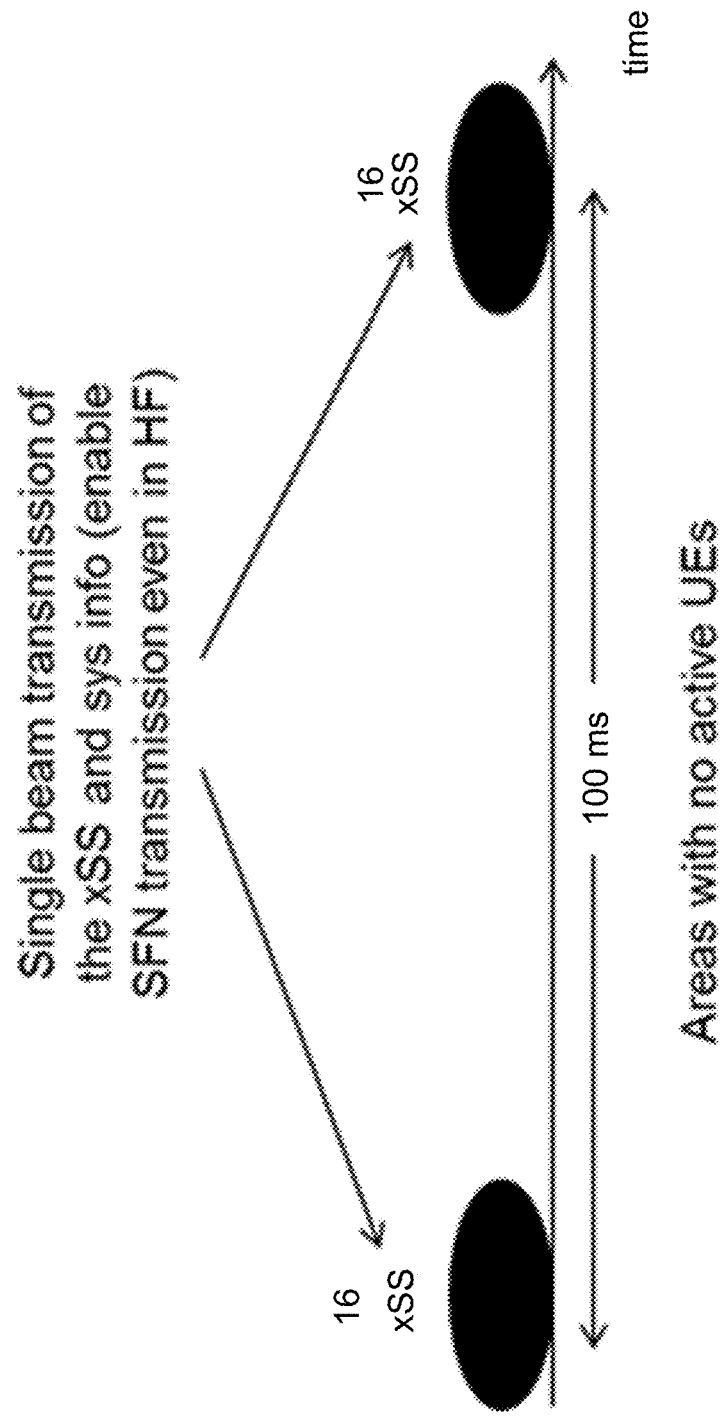
FIG. 3 is a block diagram of single beam transmission of xSS and system information.
Figure 4:
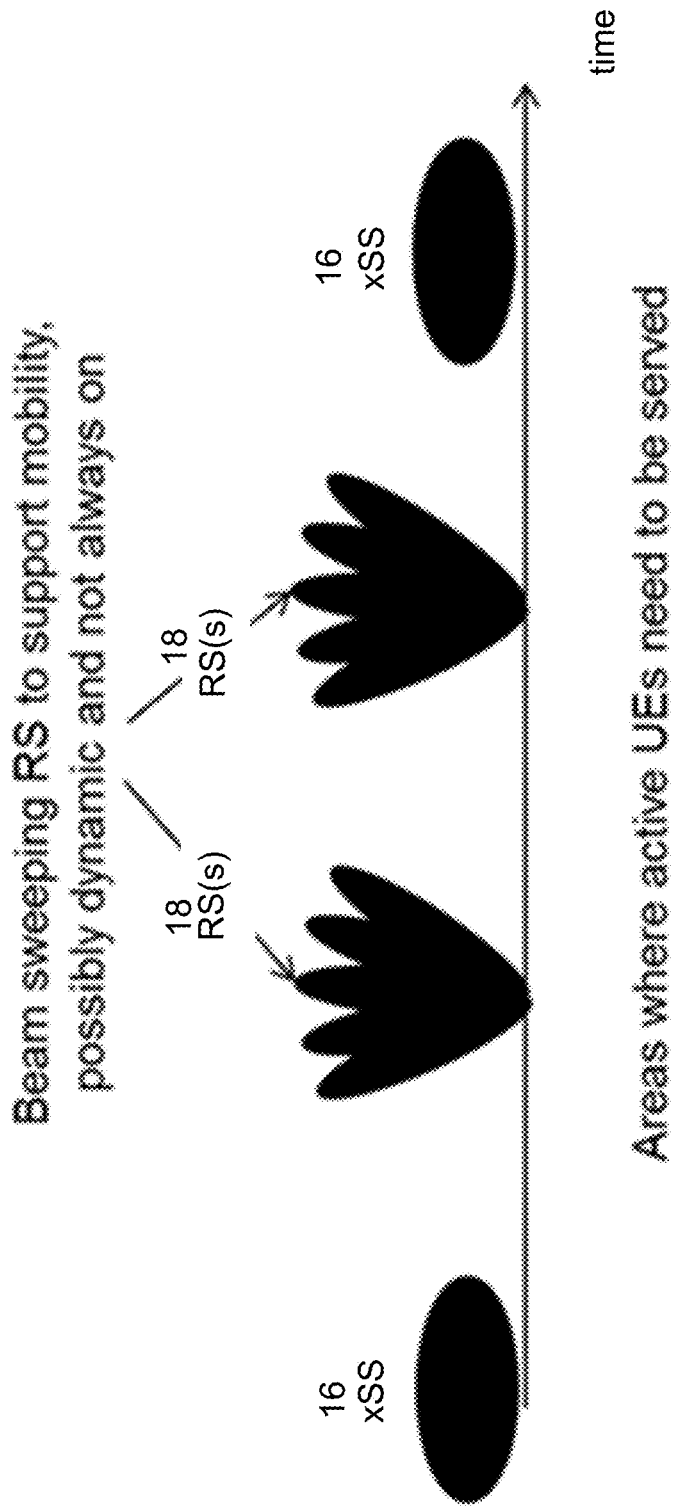
FIG. 4 is a block diagram of single beam transmission of xSS and system information, and beam sweeping transmission of mobility reference signals.
Figure 5:
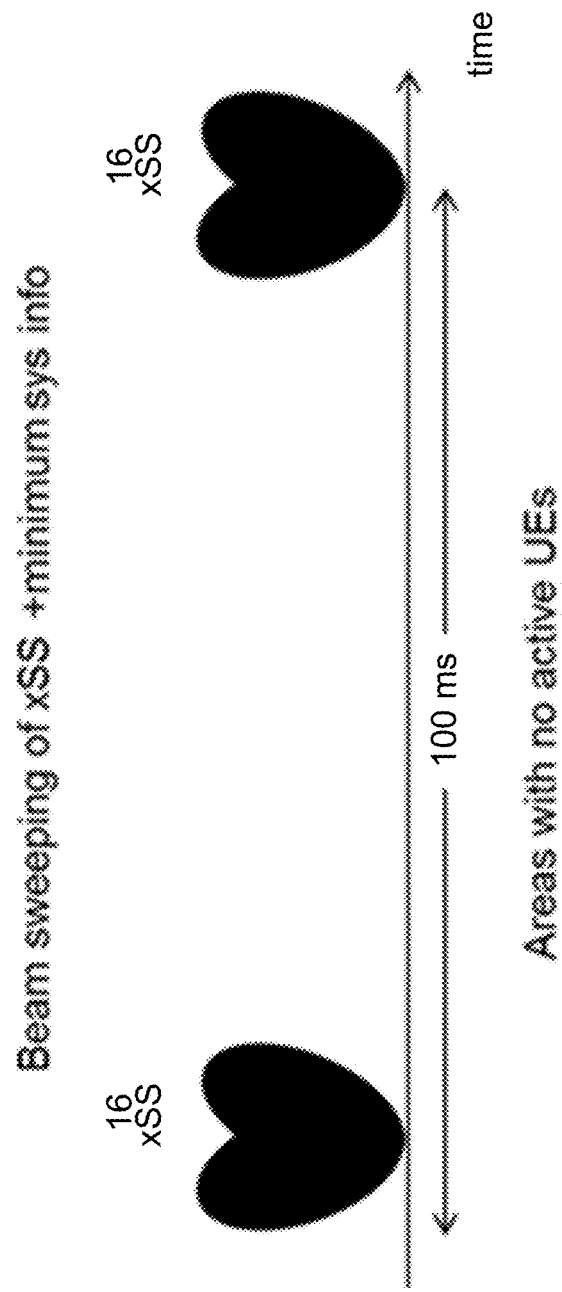
FIG. 5 is a block diagram illustrating beam sweeping transmission of xSS and system information.
Figure 6:
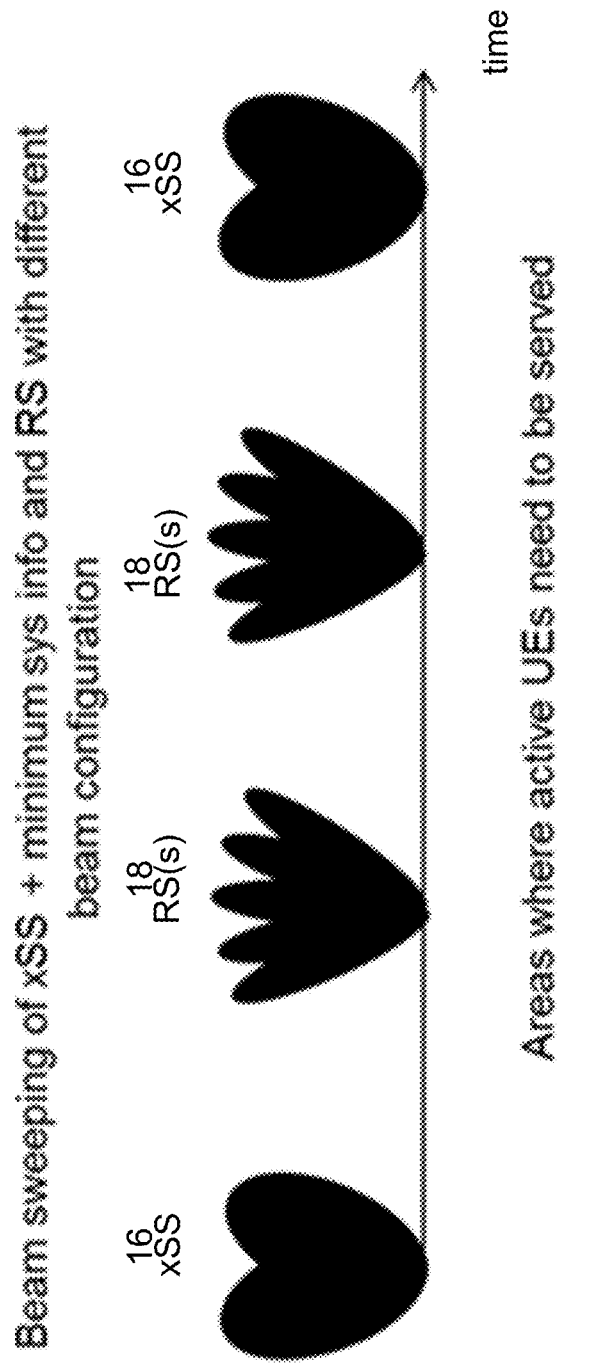
FIG. 6 is a block diagram illustrating beam sweeping transmission of xSS and system information and mobility reference signals.

As described in the Introduction, Third Generation Partnership Project (3GPP) fifth generation (5G) new radio (NR) networks may benefits from improved mobility reference signals (MRS) for user equipment (UEs) in active or connected mode, as opposed to the synchronization signals used in idle mode.

Particular embodiments described herein obviate the problems described above and include methods where the network may configure a UE in connected mode to operate using different signals supporting L3 mobility in connected mode based on different criteria. Particular embodiments consist of the network configuring the UE to either use the synchronization signals and/or reference signals used for idle mode operation (e.g., NR-PSS/NR-SSS) in connected mode, or to operate using additional dynamically configurable signals for connected mode UEs.

Support for L3 mobility described herein includes procedures such as synchronization acquisition in connected mode (e.g., for data detection), cell-based and/or beam-based radio resource management (RRM) measurements that may trigger mobility events that may be transmitted in L3 measurements reports, and/or the synchronization reference associated to a neighbor link to connect to (via PRACH preamble transmission) upon receiving a handover command. Some examples of signals the connected mode UE can be configured to measure include the following: (a) non-beamformed (or wide-beam) transmission of synchronization signals (SS) (primarily used for idle mode operation) configured so that a connected UE can perform cell-level RRM measurements; (b) beam-swept transmission of synchronization signals (SS) (primarily used for idle mode operation) configured so the UE performs cell-based RRM measurements based on filtered measurements on the different beams; (c) beam-swept transmission of mobility reference signals (MRSs) and or any other beam-specific reference signal (BRS) carrying a beam ID so the UE performs beam-based RRM measurements based on filtered measurements on the different beams; and (d) beam-swept transmission of MRSs carrying a beam ID and a cell ID, forming a beam group per cell, where the UE performs cell-level RRM measurements based on filtered measurements on the different beams.

The configuration may selected based on network deployment parameters that may include frequency band (sub-6, 6-15, 28-60 GHz, etc.) or carrier frequency, site deployment type (macro/pico), expected mobility character (outdoor/indoor, urban/suburban/rural), planned user density, etc. The configuration may be additionally selected based on current usage scenario parameters (e.g., the number of users currently in the system). UEs are configured to measure and report according to the chosen configuration via control signaling, such as radio resource control (RRC) signaling.

The following description sets forth numerous specific details. It is understood, however, that embodiments may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments, whether or not explicitly described.

Particular embodiments are described with reference to FIGS. 7-20B of the drawings, like numerals being used for like and corresponding parts of the various drawings. LTE and NR are used throughout this disclosure as example cellular systems, but the ideas presented herein may apply to other wireless communication systems as well.

Figure 7:
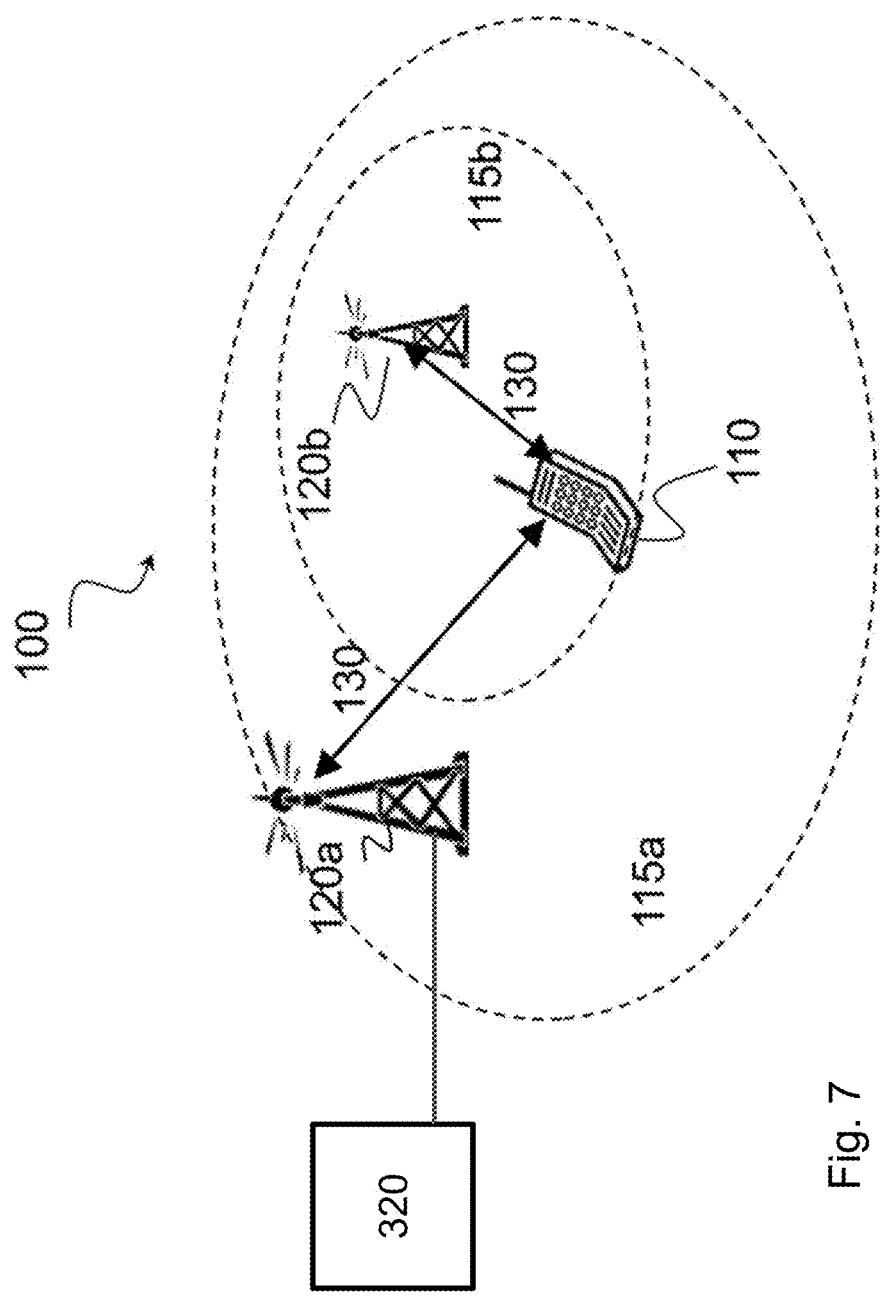
FIG. 7 is a block diagram illustrating an example wireless network, according to a particular embodiment.

FIG. 7 is a block diagram illustrating an example wireless network, according to a particular embodiment. Wireless network 100 includes one or more wireless devices 110 (such as mobile phones, smart phones, laptop computers, tablet computers, MTC devices, or any other devices that can provide wireless communication) and a plurality of network nodes 120 (such as base stations or eNodeBs). Network node 120 serves coverage area 115 (also referred to as cell 115).

In general, wireless devices 110 that are within coverage of radio network node 120 (e.g., within cell 115 served by network node 120) communicate with radio network node 120 by transmitting and receiving wireless signals 130. For example, wireless devices 110 and radio network node 120 may communicate wireless signals 130 containing voice traffic, data traffic, and/or control signals. A network node 120 communicating voice traffic, data traffic, and/or control signals to wireless device 110 may be referred to as a serving network node 120 for the wireless device 110.

In some embodiments, wireless device 110 may be referred to by the non-limiting term "UE." A UE may include any type of wireless device capable of communicating with a network node or another UE over radio signals. The UE may comprise radio communication device, target device, device to device (D2D) UE, machine type UE or UE capable of machine to machine communication (M2M), a sensor equipped with UE, iPAD, Tablet, mobile terminals, smart phone, laptop embedded equipped (LEE), laptop mounted equipment (LME), USB dongles, Customer Premises Equipment (CPE), etc.

In some embodiments, network node 120 may include any type of network node such as a base station, radio base station, base transceiver station, base station controller, network controller, evolved Node B (eNB), Node B, gNB, multi-RAT base station, Multi-cell/multicast Coordination Entity (MCE), relay node, access point, radio access point, Remote Radio Unit (RRU) Remote Radio Head (RRH), a core network node (e.g., MME, SON node, a coordinating node, etc.), or even an external node (e.g., 3rd party node, a node external to the current network), etc.

Wireless signals 130 may include both downlink transmissions (from radio network node 120 to wireless devices 110) and uplink transmissions (from wireless devices 110 to radio network node 120). Wireless signals 130 may include synchronization signals, such as primary synchronization signals (PSS) and secondary synchronization signals (SSS). Wireless signals may include reference signals, such as channel state indicator reference signals (CSI-RS).

Each network node 120 may have a single transmitter or multiple transmitters for transmitting wireless signals 130 to wireless devices 110. In some embodiments, network node 120 may comprise a multi-input multi-output (MIMO) system. Similarly, each wireless device 110 may have a single receiver or multiple receivers for receiving signals 130 from network nodes 120.

Network 100 may include carrier aggregation. For example, wireless device 110 may be served by both network node 120*a* and 120*b* and communicate wireless signals 130 with both network node 120*a* and 120*b*.

In certain embodiments, network nodes 125 may interface with a radio network controller (RNC). The radio network controller may control network nodes 120 and may provide certain radio resource management functions, mobility management functions, and/or other suitable functions. In certain embodiments, the functions of the radio network controller may be included in network node 120. The radio network controller may interface with a core network node (CN), such as core network node 320.

In certain embodiments, the radio network controller may interface with core network node 320 via an interconnecting wired or wireless network. The interconnecting network may refer to any interconnecting system capable of transmitting audio, video, signals, data, messages, or any combination of the preceding. The interconnecting network may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, core network node 320 may manage the establishment of communication sessions and various other functionalities for wireless devices 110. Wireless devices 110 may exchange certain signals with core network node 320 using the non-access stratum layer. In non-access stratum signaling, signals between wireless devices 110 and core network node 320 may be transparently passed through the radio access network. In certain embodiments, network nodes 120 may interface with one or more network nodes 120 over an internode interface, such as, for example, an X2 interface.

Wireless device 110 may be in connected mode (e.g., being served by network node 120) or idle mode (e.g., not being served by a network node 120). In connected mode, wireless device 110 may travel from a location in cell 115*a* served by network node 120*a* to a location in cell 115*b* served by network node 120*b*. Network node 120*a* may handover wireless device 110 to network node 120*b*. Wireless device 110 may measure particular reference signals to determine whether wireless device 110 may be better served by network node 120*a* or network node 120*b*.

In particular embodiments, wireless device 110 may perform radio resource management (RRM) measurements for mobility in wireless network 100. Wireless device 110 may obtain a measurement configuration for measuring mobility signals in connected mode. The measurement configuration may includes a reference signal type. The reference signal type indicates a particular type of reference signal of a plurality of possible reference signal types (e.g., NR-PSS/SSS, CSI-RS, DMRS, etc.). Wireless device 110 may configure itself to measure a reference signal of the indicated reference signal type. Wireless device may receive the reference signal of the indicated reference signal type, and measure the reference signal according to the measurement configuration. In particular embodiments, the measurement configuration includes a configuration for non-beamformed, wide-beam, and/or beam-swept reception of the signals.

In some embodiments, wireless device 110 may sending a measurement report based on the received reference signal to a network node. Wireless device 110 may perform a handover based on the measurements.

In particular embodiments, wireless device 110 may receive a measurement configuration for a second reference signal type. Wireless device 110 may use the second configuration for receiving and measuring reference signals of the second type.

Network node 120 is capable of configuring wireless device 110 to measure reference signals for mobility in wireless network 100. Network node 120 obtains a measurement configuration for measuring mobility signals in connected mode. The measurement configuration includes a reference signal type as described above. Network node 120 transmits the measurement configuration to wireless device 100. Network node 120 also transmits the reference signal of the indicated reference signal type. Particular examples with respect to a wireless device and a network node are described in more detail with respect to FIGS. 8-17.

In wireless network 100, each radio network node 120 may use any suitable radio access technology, such as long term evolution (LTE), LTE-Advanced, NR, UMTS, HSPA, GSM, cdma2000, WiMax, WiFi, and/or other suitable radio access technology. Wireless network 100 may include any suitable combination of one or more radio access technologies. For purposes of example, various embodiments may be described within the context of certain radio access technologies. However, the scope of the disclosure is not limited to the examples and other embodiments could use different radio access technologies.

As described above, embodiments of a wireless network may include one or more wireless devices and one or more different types of radio network nodes capable of communicating with the wireless devices. The network may also include any additional elements suitable to support communication between wireless devices or between a wireless device and another communication device (such as a landline telephone). A wireless device may include any suitable combination of hardware and/or software. For example, in particular embodiments, a wireless device, such as wireless device 110, may include the components described below with respect to FIG. 18A. Similarly, a network node may include any suitable combination of hardware and/or software. For example, in particular embodiments, a network node, such as network node 120, may include the components described below with respect to FIG. 19A. A core network node may include any suitable combination of hardware and/or software. For example, in particular embodiments, a core network node, such as core network node 320, may include the components described below with respect to FIG. 20A.

In general, a network control unit in charge of AMM configuration retrieves known deployment information from a previously configured database, and/or current network usage information from recent usage statistics collected by network algorithms during, for example, the recent hours or days. The network control unit in charge of AMM configuration may be implemented in a physical network node or in a virtual (cloud) node.

The control unit determines the suitable AMM configuration based on the retrieved parameters. Numerous examples of which preferred configurations correspond to which deployment and network usage parameters are provided below. The control unit configures the network nodes (e.g., gNBs) to transmit reference signals for AMM measurement and to receive measurement reports from UEs according to a predetermined protocol. The configuration may include defining measurement gaps to measure reference signals whose signal power is significantly lower than the data power. In case the default idle mode reference signals are used for AMM measurements, there may be no additional AMM reference signal configurations, but nevertheless AMM reporting configuration.

The control unit may configure one or more UEs to measure the selected AMM reference signal and report them according to the selected procedure. In continuation, the network transmits the AMM reference signals and receives AMM measurement reports according to the selected configuration, uses the reports to evaluate the need for handover, and preforms any required handovers (e.g., according to legacy procedures). With respect to the UE, it follows the measurement, reporting and handover reconfiguration instructions provided by the network.

Particular embodiments refer to various types of signals. One example of relevant idle mode signals is the synchronization signal (SS), which includes a primary synchronization signal (PSS) for initial time/frequency synchronization, detected in the time domain, and a secondary synchronization signal (SSS) detected in the frequency domain. The SS as a whole encodes the cell ID. It is usually transmitted omni-directionally, or swept in wide beams. However, it is also technically possible to sweep it in narrow, high-gain beams. The SS is transmitted in fixed frequency resources. It is permanently present (always on), with periodicity chosen to primarily support idle mode operation.

One example of an AMM-specific reference signal is the mobility reference signal (MRS), consisting of TSS for initial time/frequency synchronization, detected in the time domain, and BRS detected in the frequency domain. Additional associated fields may be included (e.g., inclusion of cell ID in MRS).

The MRS signal consists of two fields, a synchronization field, herein referred to as TSS, and a link (cell or beam) identity field, herein referred to as BRS. The fields are multiplexed into a single OFDM symbol that halves the beam sweeping duration for a given number of beams. An example of MRS symbols for beam sweeping is illustrated in FIG. 8.

Figure 8:
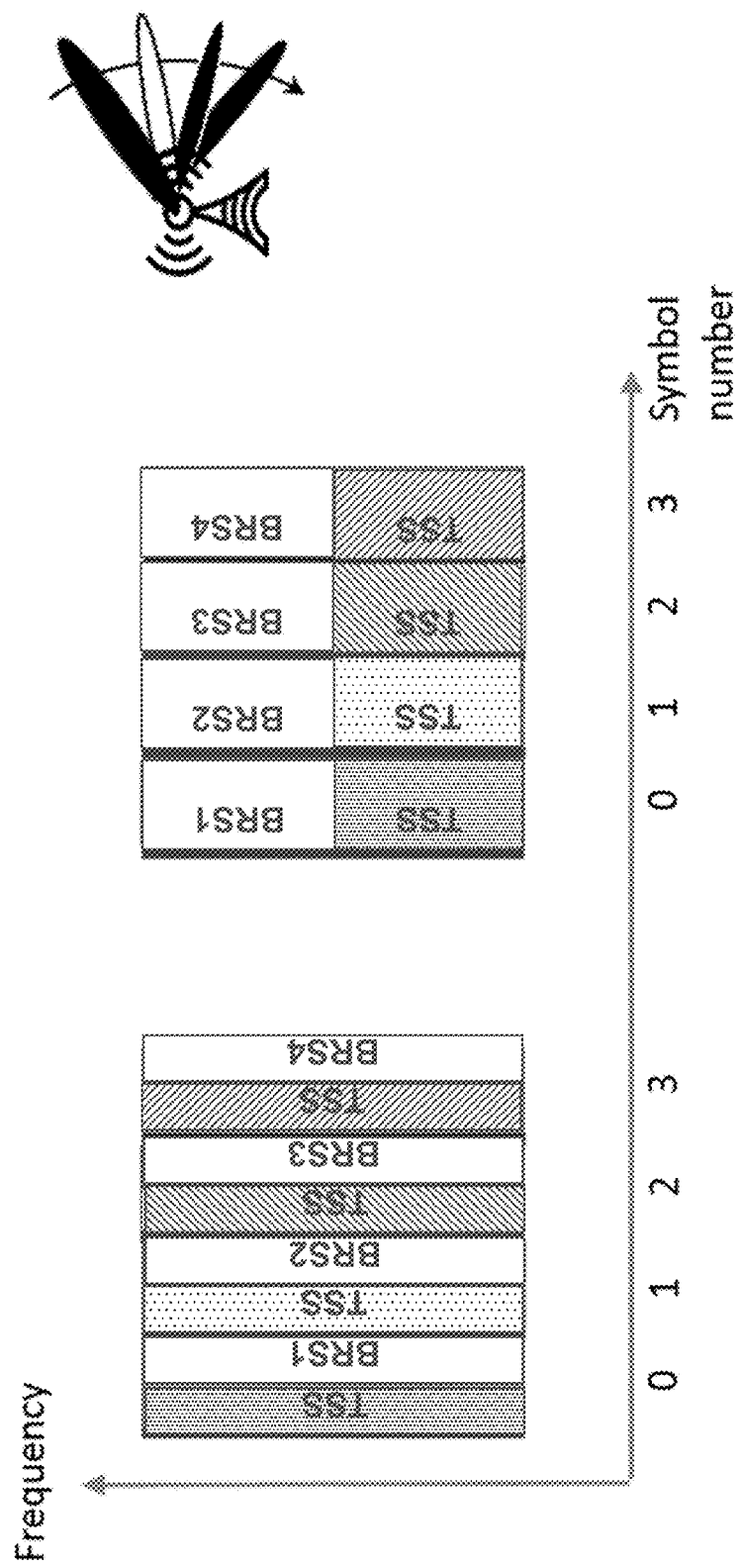
FIG. 8 is a block diagram illustrating MRS symbols used for beam sweeping, according to some embodiments.

FIG. 8 is a block diagram illustrating MRS symbols used for beam sweeping, according to some embodiments. The horizontal axis represents time and the vertical axis represents frequency. The MRS signal design consists of TSS and BID fields (T and B concatenation) and the use of multiple MRSs in sweeping. Beams from the same transmission reception point (TRP) may use the same TSS, while the BRS fields identify individual beams. Although the illustrated example shows equal resource allocation to the two fields, marked by different shading, they may be allocated unequally.

The TSS field, conceptually similar to the PSS in long term evolution (LTE), may be a Zadoff-Chu sequence which have been used in LTE for initial timing synchronization. A single sequence, or a small number of them, may be used to minimize the UE search effort.

The BRS sequence, similar in function to the SSS in LTE, may be a pseudo-random binary sequence (e.g., an M-sequence or a Gold sequence). Tens to hundreds of BRS sequences with good cross-correlation properties may be accommodated.

The MRS as a whole encodes its beam ID and optionally the associated cell ID. Because the total length of the BID+CID set may be on the order of 20 bits, it may not be suitable for single-message sequence modulation. The optional CID info may be accommodated in several possible ways. One example adds CID as a sequence-modulated field. The CID info is added as a separate field, separate from the TSS+BRS fields, but linked to it in an unambiguous manner using scrambling. An example is illustrated in FIG. 9.

Figure 9:
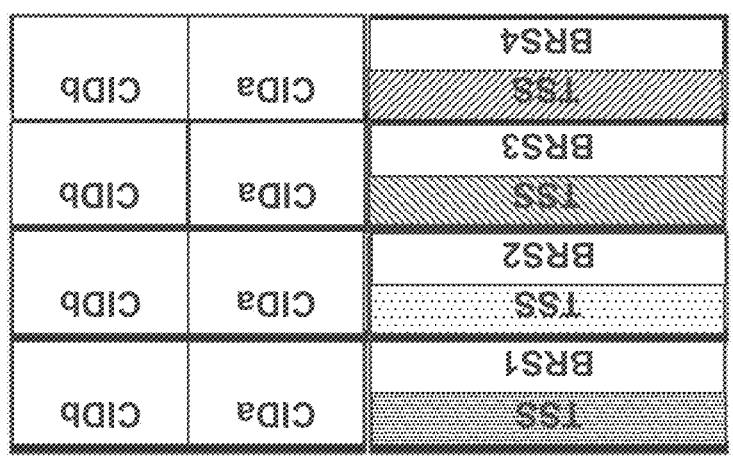
FIG. 9 is a block diagram illustrating CID transmitted in association with MRS, according to some embodiments.

FIG. 9 is a block diagram illustrating CID transmitted in association with MRS, according to some embodiments. The horizontal axis represents time and the vertical axis represents frequency. The CID is transmitted in association with the MRS (TSS/BSR) as two 5-bit sequence modulated sequences. To unambiguously associate the CID transmission parts (CIDa and CIDb), they are scrambled (e.g., with the MRS identity).

To accommodate 10 bits of CID without requiring excessively long sequences, the CID field may be divided into two length-5 sub-fields CIDa and CIDb that are separately sequence modulated, using e.g. M-sequences. The CIDa and CIDb fields are scrambled in the frequency domain with a scrambling sequence derived from the BID in the MRS. The UE thus first detects the MRS in time and frequency domains, next extracts the scrambling sequence, and detects the contents of the CIDa and CIDb fields in the frequency domain. Since scrambling is removed prior to detection, the cross-correlation properties of the CID sequence are not negatively affected by scrambling. This approach keeps the duration of each beam transmission in a beam sweep to a single symbol.

Another example includes adding CID as a conventionally encoded field. The CID info is added as a separate field in the transmitted MRS beam, separate from the TSS+BRS fields, but using conventional modulation and encoding. An example is illustrated in FIG. 10.

Figure 10:
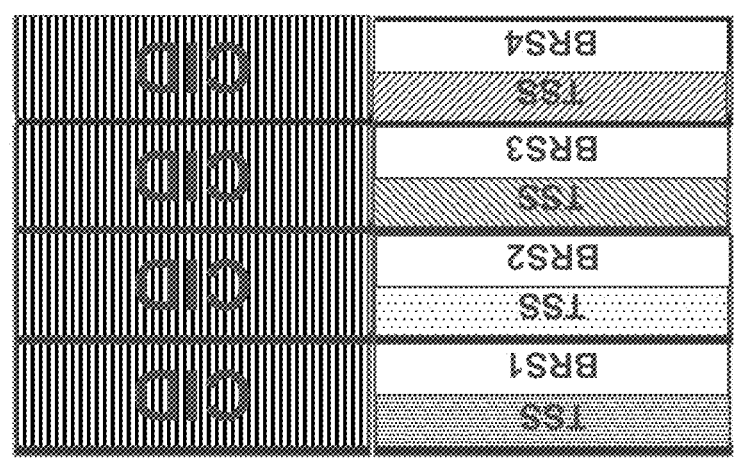
FIG. 10 is a block diagram illustrating another example of CID transmitted in association with MRS, according to some embodiments.

FIG. 10 is a block diagram illustrating another example of CID transmitted in association with MRS, according to some embodiments. The horizontal axis represents time and the vertical axis represents frequency. In the illustrated example, the CID is transmitted in association with the MRS (TSS/BSR) as a conventionally encoded field in a physical channel. The physical channel containing the associated CID can be made unambiguous by using a DMRS or a scrambling code derived from the MRS identity.

The CID field is a sequence of encoded and QAM-modulated symbols occupying resource elements (REs) in the same single symbol as the TSS/BRS fields. The CID field contains REs with DMRS for the purposes of channel estimation, indicated with black in the figure. Encoding scheme and rate of the CID field is chosen appropriately to provide a sufficient link budget.

The UE first detects the MRS in time and frequency domains, next extracts the DMRS sequence as a function of the BID, and finally estimates the channel and demodulates/decodes the CID field. As above, this approach keeps the duration of each beam transmission in a beam sweep to a single symbol.

Some embodiments may provide CID using a physical downlink channel (PDCH) container. The CID info is added as a separate PDCH transmission, transmitted with same beamforming as the TSS/BRS fields. An example is illustrated in FIG. 11.

Figure 11:
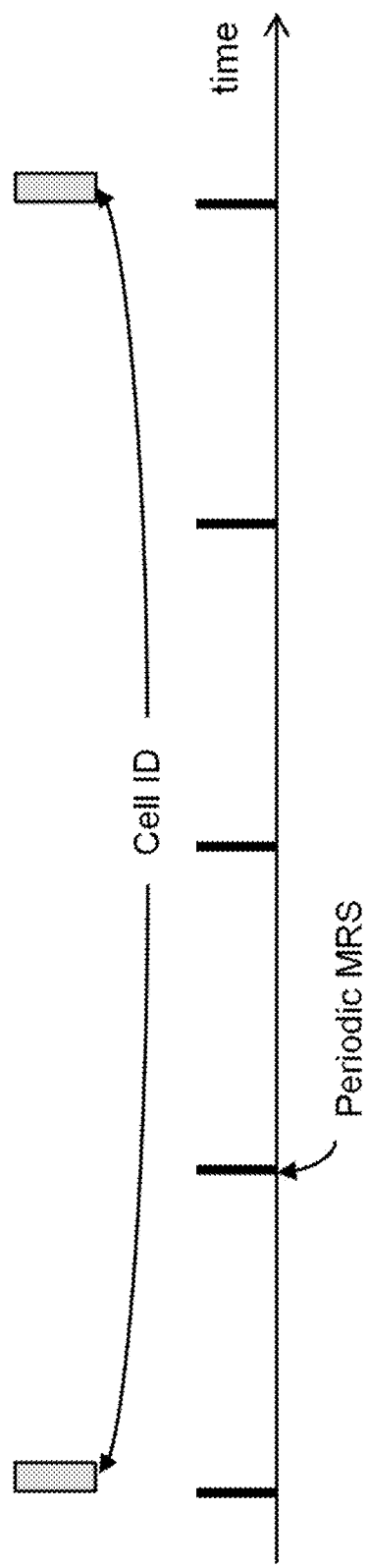
FIG. 11 is a block diagram illustrating CID transmitted in a PDCH, according to some embodiments.

FIG. 11 is a block diagram illustrating CID transmitted in a PDCH, according to some embodiments. The horizontal axis represents time. In the illustrated example, the CID associated with a particular MRS may be periodically scheduled using a PDCCH/PDSCH configuration derived from the MRS identity. This PDCCH/PDCH configuration is transmitted using the same beamforming as the associated MRS.

The CID field is a conventional PDCCH/PDCH transmission containing the CID info. Not every MRS transmission needs to be accompanied by the PDCH container. The UE first detects the MRS in time and frequency domains. The BID info maps either to a RNTI for receiving the PDCCH which in turn points to the PDCH. Alternatively, the BID info may map to the PDCH parameters (RBs, DMRS, MCS, etc.) directly.

Some embodiments provide CID info via dedicated control signaling to the UE. For example, the UE may be previously configured with mappings between the possible BIDS conveyed by the MRS and their corresponding CIDs. The MRS transmissions then keeps its original format and no CID info is conveyed over the air. This approach is an efficient solution for deployments with wide-beam, periodic MRS transmissions where the MRS-to-cell mapping changes infrequently. Whenever a change occurs, the NW reconfigures the UE with the updated mapping.

Some embodiments infer the same originating cell from MRS ID sub-range. For example, a predetermined set of BID bits conveyed by the MRS may be allocated as locally unique for a given originating cell, forming a group ID. For example, the 4 MSBs in a 10-bit BID could be the same for all beams originating from a certain cell, while the 6 LSBs could be beam-specific. The BID bits may be conveyed in different dimensions of the MRS signal (time/frequency/TSS sequence/BRS sequence) and the group ID bits extracted upon MRS reception. A special case of separating a group ID field in the BID bits is by transmitting the group ID field as a separate signal that the UE can receive disjointly from the rest of the BID bits in the MRS.

Some embodiments infer the same originating cell from MRS frequency. For example, each cell in a local neighborhood is allocated a distinct frequency subband for MRS transmission. All MRSs detected in a certain subband may then be assumed to originate from the same cell.

MRS is often transmitted in narrow beams and is more dynamically configured. In other AMM reference signal embodiments, the BRS may not be accompanied by a dedicated synch field like a TSS, but uses the SS as the synch source.

The following are example AMM RS configurations (i.e., signals a connected mode UE can be configured to measure, and the operations to perform). In one example, non-beamformed (or beamformed in wide beams) transmission of synchronization signals (SS) (primarily used for idle mode operation) are configured so that a connected UE can perform cell-level RRM measurements.

The network may also configure measurement, transmission, or beamforming gaps where data is not scheduled and high gain beamforming is not used. In this configuration the UE also performs a handover based on these signals (i.e., it uses the SS as the downlink synchronization reference to the received PRACH configuration). That configuration can be used in lower frequency bands where detecting non-beamformed signals and data channels simultaneously is not a problem. In higher frequency bands, the network can also use that configuration when traffic is very bursty and/or periodicity of signals to support mobility is not required to be so frequent so that the introduction of measurement/beamforming gaps does significantly degrade the data rates. The UE does not require a substantial amount of configuration because the UE may autonomously find signals supporting idle mode operation (e.g., fixed positions of the carrier frequency).

Figure 12:
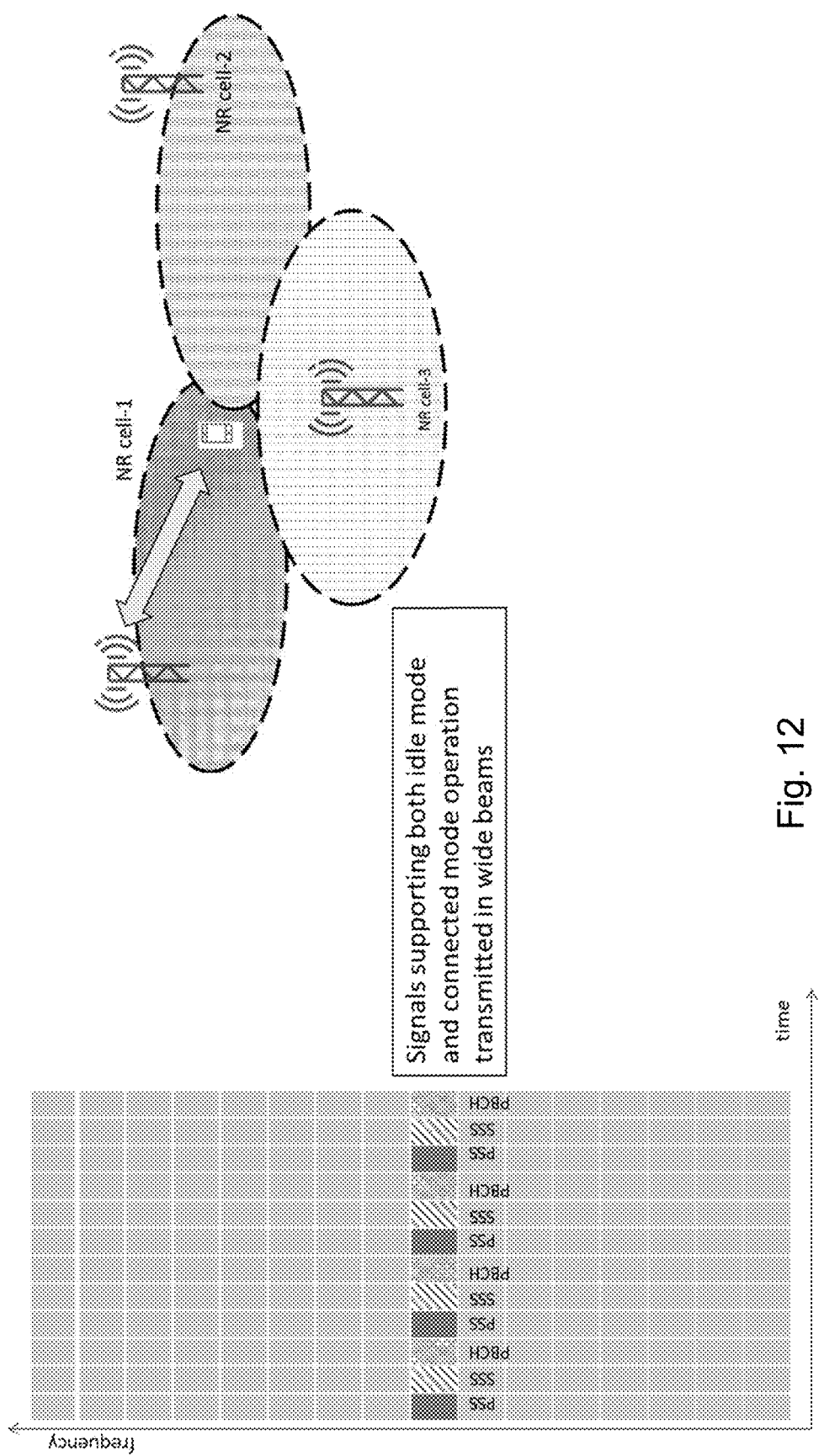
FIG. 12 is an example of signals supporting both idle mode and connected mode transmitted in wide beams, according to a particular embodiment.

An example is illustrated in FIG. 12. FIG. 12 is an example of signals supporting both idle mode and connected mode transmitted in wide beams, according to a particular embodiment.

In another example, beam-swept transmission of synchronization signals (SS) (primarily used for idle mode operation) are configured so the UE performs cell-based RRM measurements based on filtered measurements on the different beams (e.g., averaging multiple occasions of the same beam as criteria to trigger mobility events or averaging multiple beams that can be detected in the same sweeping interval). This example can be used in higher frequencies where idle mode signals are beamformed, for example, to improve PRACH coverage. The UE may reuse the signals for connected mode operation for both synchronization acquisition and/or performing RRM measurements. Depending on the way signals are beamformed, UEs may need to configure measurement gaps. The network may first assume gaps are needed and upon the reception of first reports reconfigure the UE without the gaps.

Figure 13:
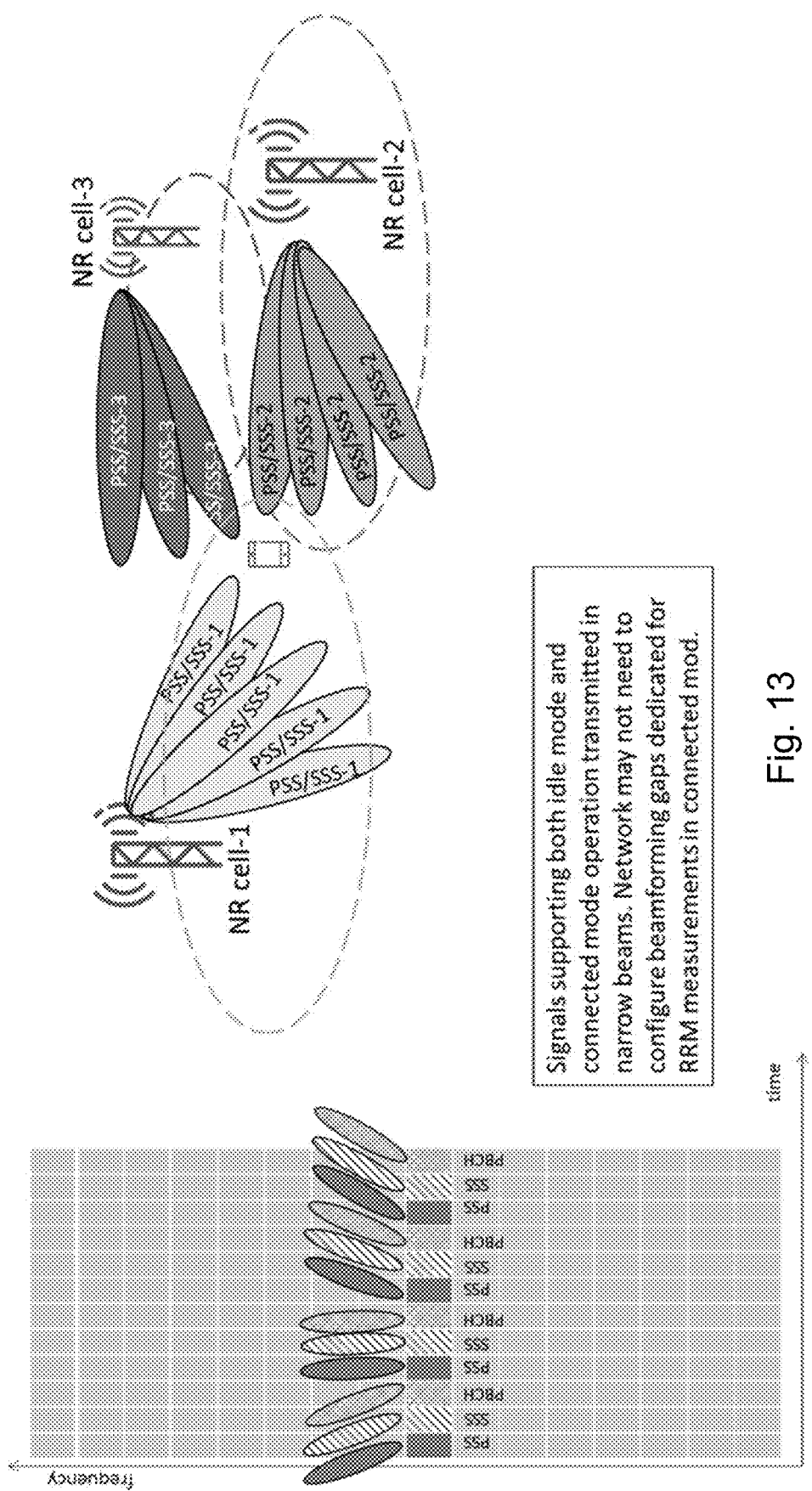
FIG. 13 is an example of signals supporting both idle mode and connected mode transmitted in narrow beams, according to a particular embodiment.

An example is illustrated in FIG. 13. FIG. 13 is an example of signals supporting both idle mode and connected mode transmitted in narrow beams, according to a particular embodiment. The network may not need to configure beamforming gaps dedicated for RRM measurements in connected mode.

Another example includes beam-swept transmission of mobility reference signals (MRSs) and or any other beam-specific reference signal (BRS) carrying a beam ID so the UE performs beam-based RRM measurements based on filtered measurements on the different beams (e.g., averaging multiple occasions of the same beam as criteria to trigger mobility events or averaging multiple beams that can be detected in the same sweeping interval). The signals may be beamformed in such a way that the UE does not need measurement gaps. They can also be used as a beam-based downlink synchronization reference for handovers when a handover command is provided with a specific beam ID and a specific PRACH resource associated to that downlink reference. Beam-based handovers can be useful when the network is very loaded and a handover is accepted by a target for specific beams that might not be as loaded.

Figure 14:
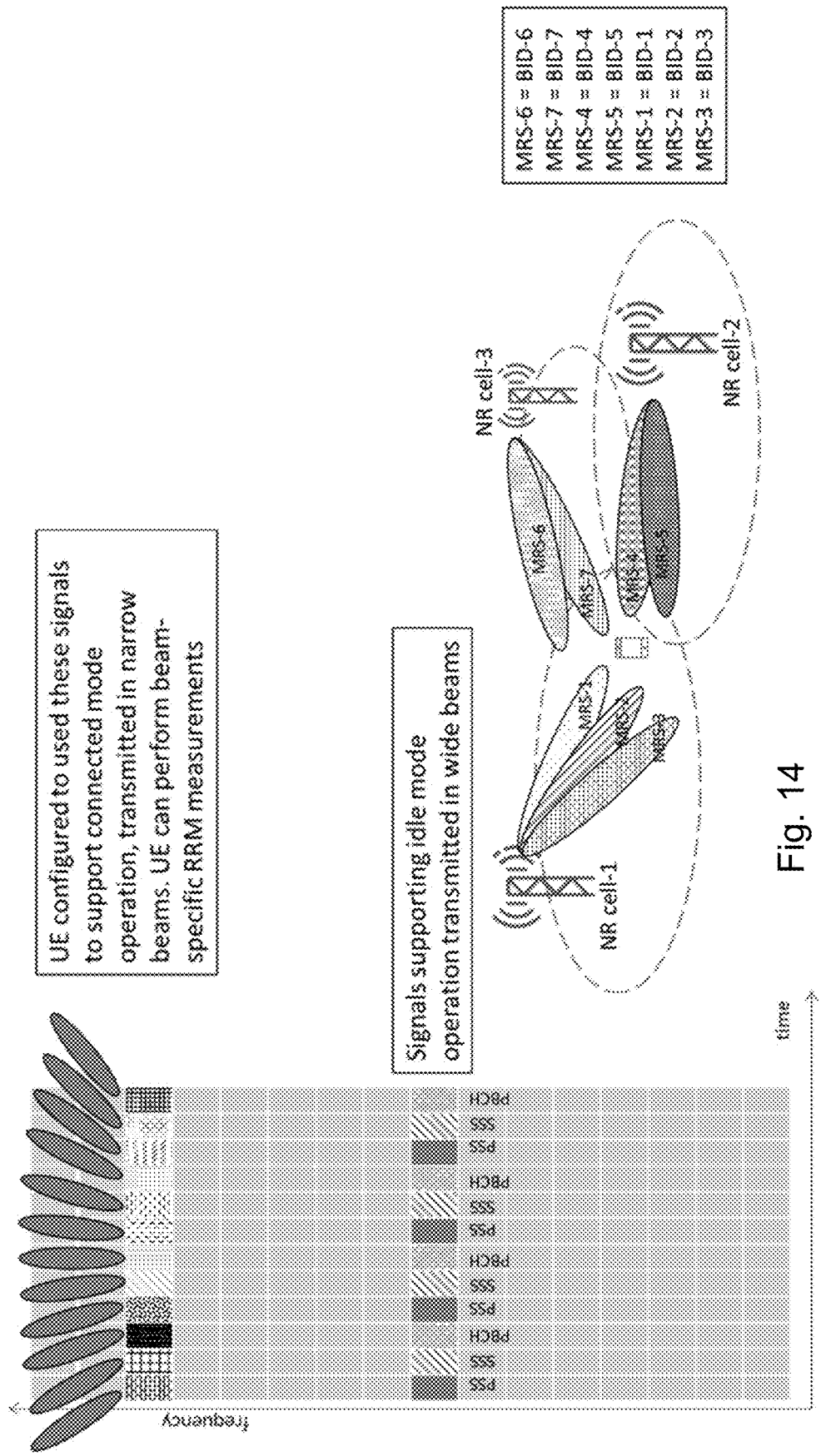
FIG. 14 is an example of one group of signals supporting connected mode transmitted in narrow beams and another group of signals supporting idle mode transmitted in wide beams, according to a particular embodiment.

An example is illustrated in FIG. 14. FIG. 14 is an example of one group of signals supporting connected mode transmitted in narrow beams and another group of signals supporting idle mode transmitted in wide beams, according to a particular embodiment.

In another example, beam-swept transmission of mobility reference signals (MRSs) carrying a beam ID and a cell ID form a beam group per cell. A UE may be configured in to perform cell-level RRM measurements based on filtered measurements on the different beams (e.g., averaging multiple occasions of the same beam as criteria to trigger mobility events or averaging multiple beams that can be detected in the same sweeping interval). However, the network has the flexibility to use the MRSs in two different ways for handovers. In one way the UE receives a handover command with the target cell ID and the UE can access any of the beams. In another way the UE receives the handover command with the specific beam in the target cell.

Figure 15:
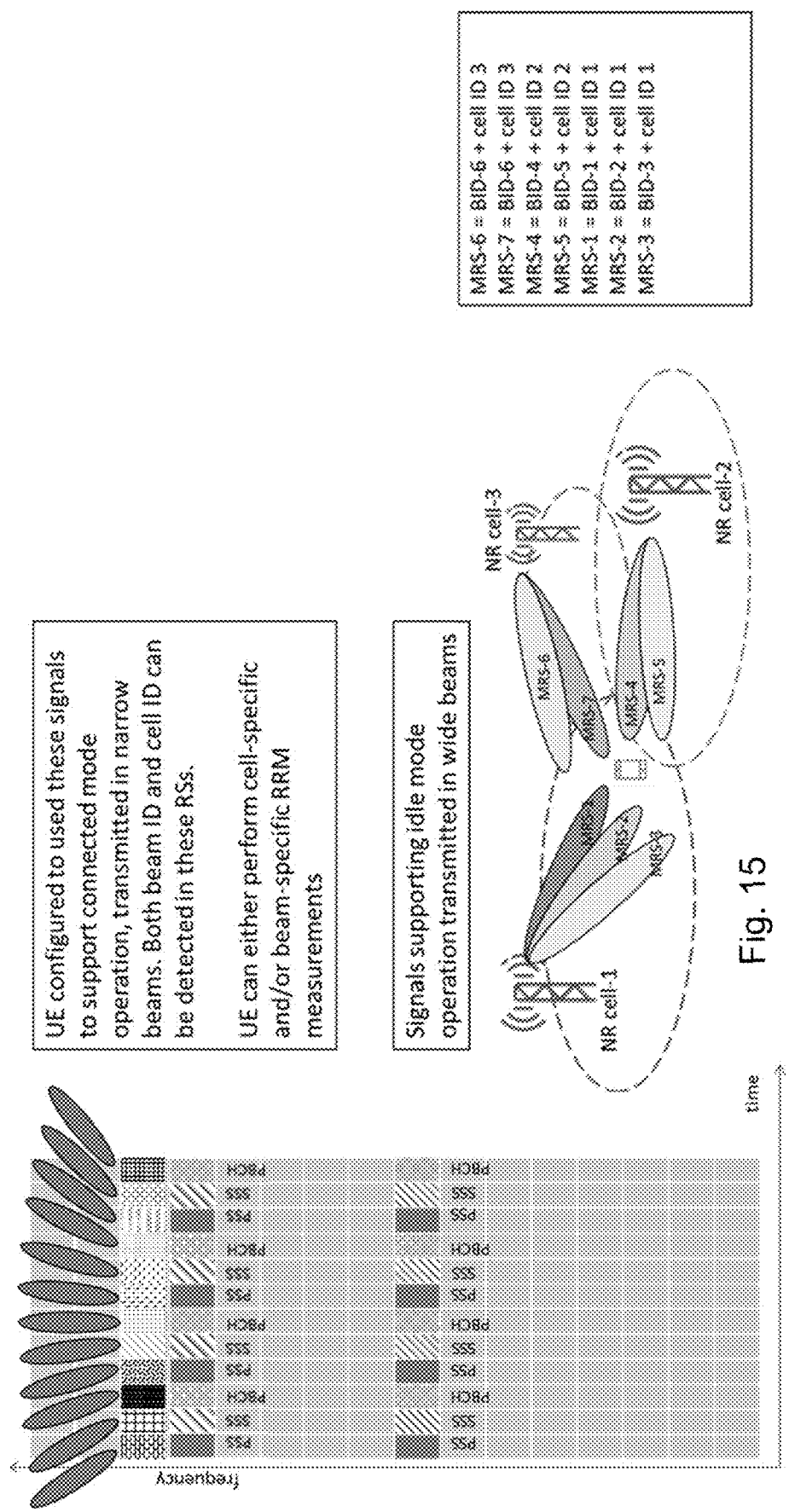
FIG. 15 is another example of one group of signals supporting connected mode transmitted in narrow beams and another group of signals supporting idle mode transmitted in wide beams, according to a particular embodiment.

An example is illustrated in FIG. 15. FIG. 15 is another example of one group of signals supporting connected mode transmitted in narrow beams and another group of signals supporting idle mode transmitted in wide beams, according to a particular embodiment.

Some embodiments include additional configurations for different deployments and scenarios. Disregarding the specifics of the particular configurations, many possible configurations can be classified into the following classes of configurations: (a) non-beamformed transmission of SS used for cell-level AMM measurements, with measurement gaps; (b) beam-swept transmission of SS used for beam-level AMM measurements, without measurement gaps; (c) semi-persistently configured MRS used for AMM measurements, wide-beam (with measurement gaps); (d) semi-persistently configured MRS used for AMM measurements, narrow-beam (without measurement gaps); and (e) dynamically activated, UE-specific MRS used for AMM measurements.

Some examples of deployment/scenario factors that may be considered when selecting the AMM RS configurations are the frequency band (sub-6, 6-15, 28-60 GHz, etc.) or carrier frequency, site deployment type (macro/pico), expected mobility character (outdoor/indoor, urban/suburban/rural), planned user density, and the number of users currently in the system. The choice between the different modes may be done based on a combined preference considering a number of aspects and the deployment/scenario factors. A list of some possible such aspects includes: (a) narrowband SS versus wider-band MRS: prefer MRS if medium-dispersion deployments to capture frequency fading, an also prefer MRS (due to more power in wider bandwidth without additional power boosting) if coverage limits are a concern and beam sweeping is to be minimized; (b) long-period SS versus shorter-period MRS: prefer MRS in high-mobility deployments to guarantee required AMM handover latency, or to guarantee quick AMM procedure trigger (e.g., in high-frequency band deployments); (c) being able to detect/measure AMM RS while receiving (or being exposed to) beamformed data versus needing measurement gaps: prefer SS in deployments with moderate data BF, and prefer MRS in deployments with aggressive data BF; (d) swept versus omni/sector AMM RS: prefer swept RS when data is heavily beamformed (to avoid dynamic range problems), and when beam-level mobility measurements are required; (e) periodic vs on-demand, dedicated MRS: prefer periodic MRS with more users, wider beams, and prefer on-demand MRS with fewer users, narrower beams.

In particular embodiments, the AMM configuration may be performed infrequently (e.g., when the network layout or idle mode signal configuration have changed). Alternatively, the AMM configuration may be changed fairly dynamically (e.g., in response to changing number of UEs in the system).

The selected AMM configuration may be different in different geographical regions or in different layers of a heterogeneous network deployment. However, to ensure robustly comparable candidate link quality metrics, the configuration can be common for a large group of cells, not allocated on a per-cell basis.

Figure 16:
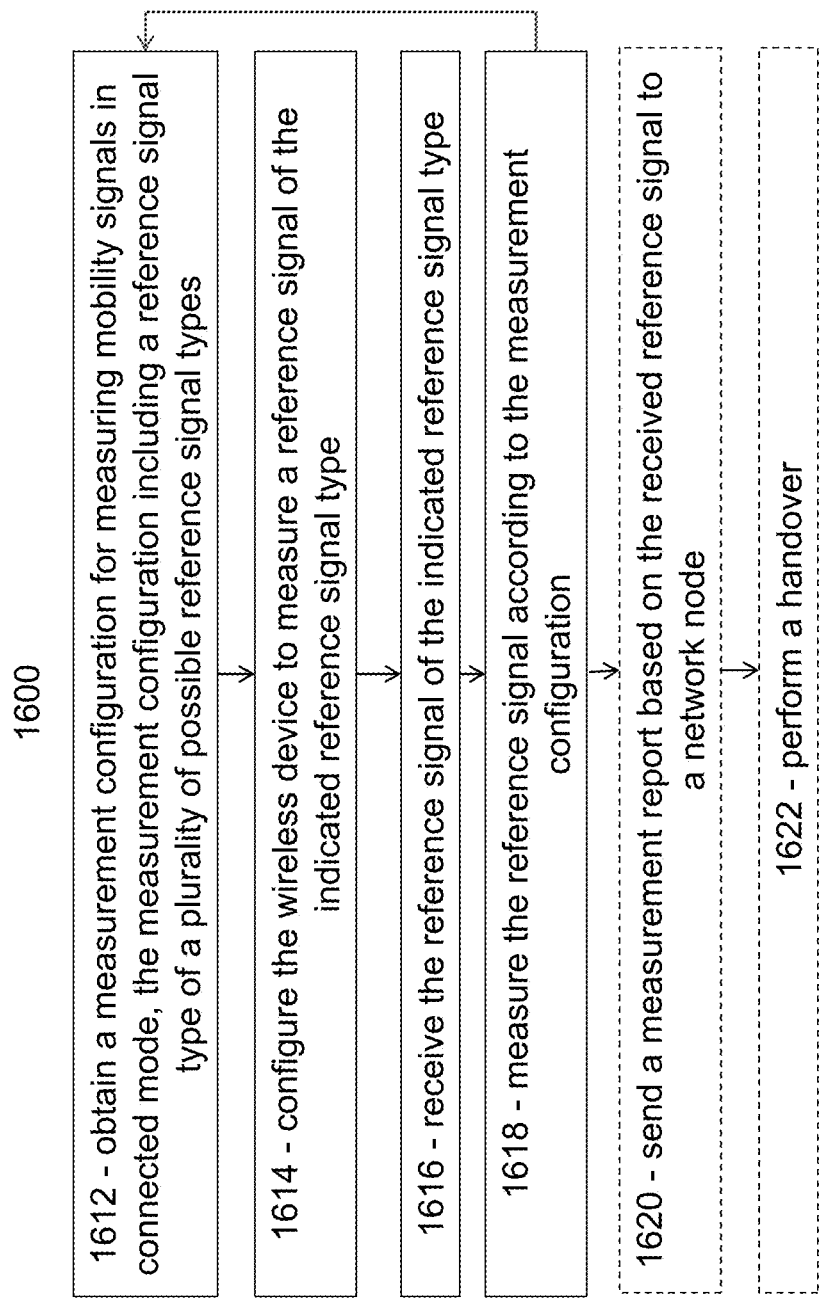
FIG. 16 is a flow diagram of an example method in a wireless device, according to some embodiments.

Particular embodiments performed in a wireless device may be generalized by FIG. 16. Particular embodiments performed in a network node may be generalized by FIG. 17.

FIG. 16 is a flow diagram illustrating an example method in a wireless device, according to some embodiments. In particular embodiments, one or more steps of FIG. 16 may be performed by wireless device 110 of wireless network 100 described with respect to FIG. 7.

The method begins at step 1612, where a network node obtains a measurement configuration for measuring mobility signals in connected mode. The measurement configuration includes a reference signal type. The reference signal type indicates a particular type of reference signal of a plurality of possible reference signal types. For example, connected mode wireless device 110 may receive signaling from network node 120 that includes a measurement configuration. The measurement configuration may include a reference signal type (e.g., PSS, SSS, DMRS, CSI-RS, etc.) as part of the measurement configuration.

The plurality of possible reference signal types may include active mode mobility signals (MRS) (e.g., CSI-RS, etc.) and idle mode synchronization signals (e.g., PSS, SSS, DMRS, etc.). The wireless device may obtains the measurement configuration according to any of the embodiments or examples described above with respect to FIGS. 7-15.

At step 1614, the wireless device configures itself to measure a reference signal of the indicated reference signal type. For example, wireless device 110 may configure itself to measure a narrow band reference signal or a wide band synchronization signal according to any of the embodiments or examples described above with respect to FIGS. 7-15.

At step 1616, the wireless device receives the reference signal of the indicated reference signal type. For example, wireless device 110 may receive the reference signal (e.g., DMRS or idle mode signal, narrow-band, wide-band, etc.) according to any of the embodiments or examples described above with respect to FIGS. 7-15.

At step 1618, the wireless device measures the reference signal according to the measurement configuration. For example, wireless device 110 may measure the reference signal according to any of the embodiments or examples described above with respect to FIGS. 7-15.

At step 1620, the wireless device sends a measurement report based on the received reference signal to a network node. For example, wireless device 110 sends a measurement report to network node 120 according to any of the embodiments or examples described above with respect to FIGS. 7-15.

At step 1622, the wireless device performs a handover. For example, wireless device 110 may perform a handover based on the results of the measurement.

Modifications, additions, or omissions may be made to method 1600 illustrated in FIG. 16. Additionally, one or more steps in method 1600 may be performed in parallel or in any suitable order.

Figure 17:
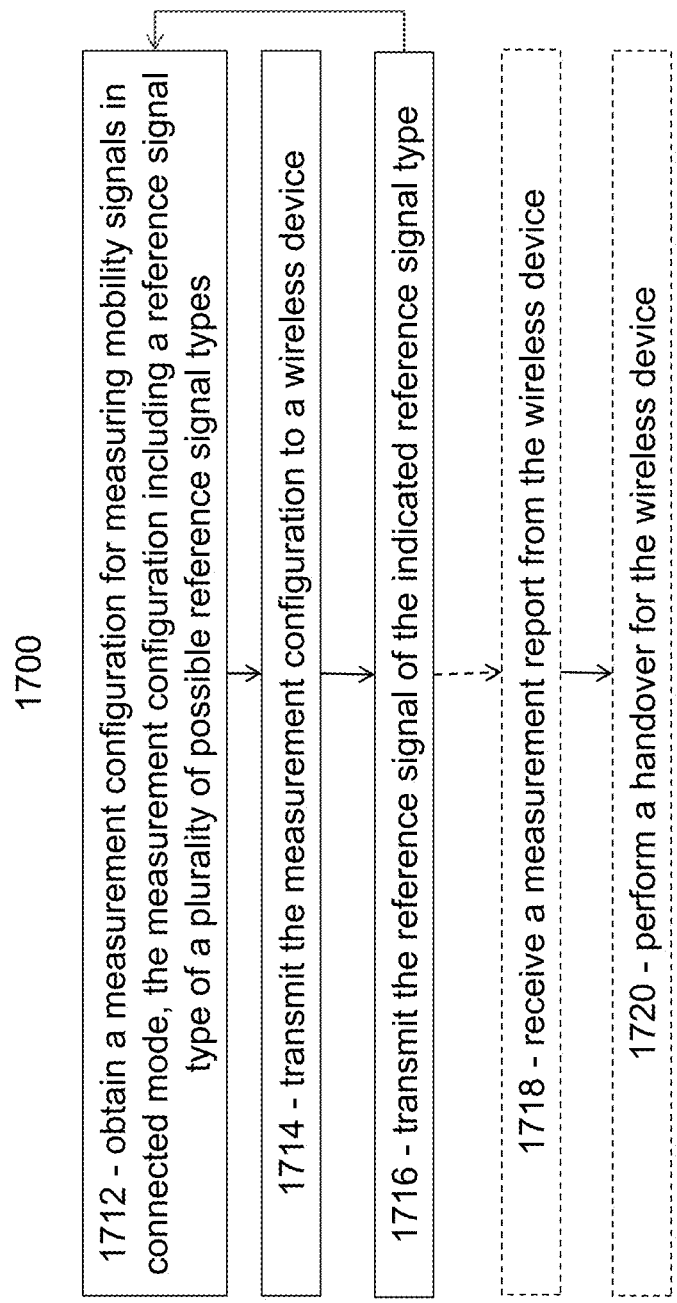
FIG. 17 is a flow diagram of an example method in a network node, according to some embodiments.

FIG. 17 is a flow diagram illustrating an example method in a network node, according to some embodiments. In particular embodiments, one or more steps of FIG. 17 may be performed by network node 120 of wireless network 100 described with respect to FIG. 7.

The method begins at step 1712, where a network node obtain a measurement configuration for measuring mobility signals in connected mode. The measurement configuration includes a reference signal type of a plurality of possible reference signal types. For example, network node 120 may obtain a measurement configuration. The measurement configuration may include a reference signal type (e.g., PSS, SSS, DMRS, CSI-RS, etc.) as part of the measurement configuration.

The plurality of possible reference signal types may include active mode mobility signals (MRS) (e.g., CSI-RS, etc.) and idle mode synchronization signals (e.g., PSS, SSS, DMRS, etc.). The wireless device may obtains the measurement configuration according to any of the embodiments or examples described above with respect to FIGS. 7-15.

At step 1714, the network node transmits the measurement configuration to a wireless device. For example, network node 120 may signal the measurement configuration to wireless device 110 according to any of the embodiments or examples described above with respect to FIGS. 7-15.

At step 1716, the network node transmits the reference signal of the indicated reference signal type. For example, network node 120 may transmit the reference signal. Wireless device 110 may receive the reference signal. Network node 120 may transmit the reference signal according to any of the embodiments or examples described above with respect to FIGS. 7-15.

At step 1718, the network node receives a measurement report from the wireless device. For example, network node 120 may receive a measurement report from wireless device 110 based on the measured reference signal.

At step 1720, the network node may perform a handover for the wireless device. For example, network node 120a may handover wireless device 110 to network node 120b based on the received measurement report.

Modifications, additions, or omissions may be made to method 1700 illustrated in FIG. 17. Additionally, one or more steps in method 1700 may be performed in parallel or in any suitable order.

Figure 18B:
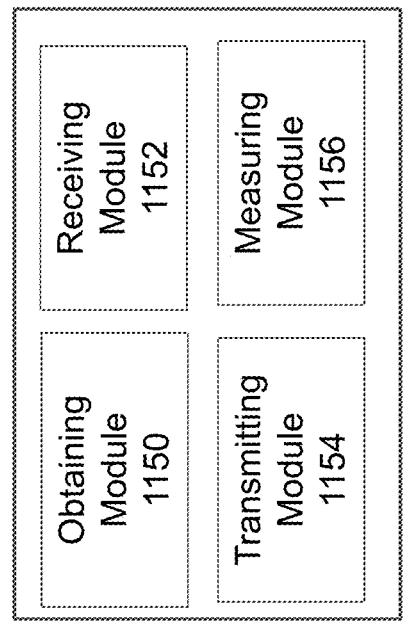
FIG. 18B is a block diagram illustrating example components of a wireless device.
Figure 18A:
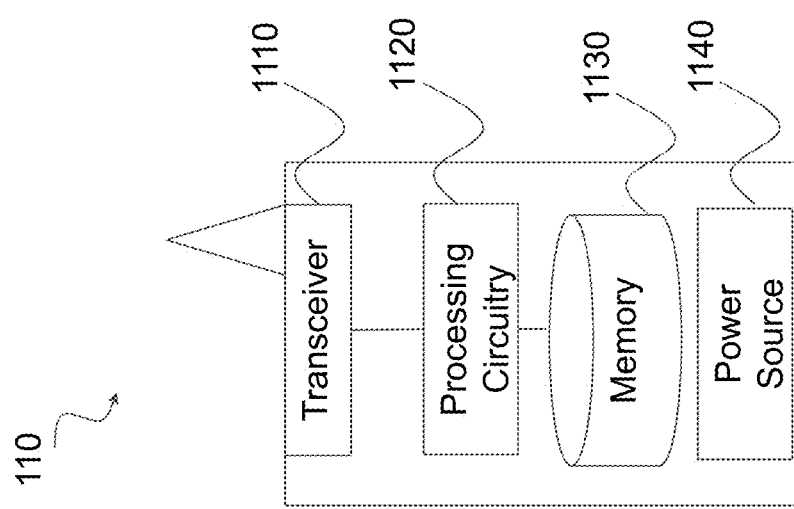
FIG. 18A is a block diagram illustrating an example embodiment of a wireless device.

FIG. 18A is a block diagram illustrating an example embodiment of a wireless device. The wireless device is an example of the wireless devices 110 illustrated in FIG. 7. In particular embodiments, the wireless device is capable of performing radio resource management (RRM) measurements for mobility in a wireless network. The wireless device is capable of obtaining a measurement configuration for measuring mobility signals in connected mode. The measurement configuration includes a reference signal type. The reference signal type indicates a particular type of reference signal of a plurality of possible reference signal types (e.g., PSS, SSS, DMRS, CSI-RS). The wireless device is capable of configuring the wireless device to measure a reference signal of the indicated type; receiving the reference signal of the indicated type; and measuring the reference signal according to the measurement configuration.

Particular examples of a wireless device include a mobile phone, a smart phone, a PDA (Personal Digital Assistant), a portable computer (e.g., laptop, tablet), a sensor, a modem, a machine type (MTC) device/machine to machine (M2M) device, laptop embedded equipment (LEE), laptop mounted equipment (LME), USB dongles, a device-to-device capable device, a vehicle-to-vehicle device, or any other device that can provide wireless communication. The wireless device includes transceiver 1110, processing circuitry 1120, memory 1130, and power source 1140. In some embodiments, transceiver 1110 facilitates transmitting wireless signals to and receiving wireless signals from wireless network node 120 (e.g., via an antenna), processing circuitry 1120 executes instructions to provide some or all of the functionality described herein as provided by the wireless device, and memory 1130 stores the instructions executed by processing circuitry 1120. Power source 1140 supplies electrical power to one or more of the components of wireless device 110, such as transceiver 1110, processing circuitry 1120, and/or memory 1130.

Processing circuitry 1120 includes any suitable combination of hardware and software implemented in one or more integrated circuits or modules to execute instructions and manipulate data to perform some or all of the described functions of the wireless device. In some embodiments, processing circuitry 1120 may include, for example, one or more computers, one more programmable logic devices, one or more central processing units (CPUs), one or more microprocessors, one or more applications, and/or other logic, and/or any suitable combination of the preceding. Processing circuitry 1120 may include analog and/or digital circuitry configured to perform some or all of the described functions of wireless device 110. For example, processing circuitry 1120 may include resistors, capacitors, inductors, transistors, diodes, and/or any other suitable circuit components.

Memory 1130 is generally operable to store computer executable code and data. Examples of memory 1130 include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or or any other volatile or non-volatile, non-transitory computer-readable and/or computer-executable memory devices that store information.

Power source 1140 is generally operable to supply electrical power to the components of wireless device 110. Power source 1140 may include any suitable type of battery, such as lithium-ion, lithium-air, lithium polymer, nickel cadmium, nickel metal hydride, or any other suitable type of battery for supplying power to a wireless device.

Other embodiments of the wireless device may include additional components (beyond those shown in FIG. 18A) responsible for providing certain aspects of the wireless device's functionality, including any of the functionality described above and/or any additional functionality (including any functionality necessary to support the solution described above).

FIG. 18B is a block diagram illustrating example components of wireless device 110. The components may include obtaining module 1150, receiving module 1152, transmitting module 1154, and measuring module 1156.

Obtaining module 1150 may perform the obtaining functions of wireless device 110. For example, obtaining module 1150 may obtain, from a network node, a measurement configuration for measuring mobility signals in connected mode, as described in any of the embodiments or examples above (e.g., step 1612 of FIG. 16). In certain embodiments, obtaining module 1150 may include or be included in processing circuitry 1120. In particular embodiments, obtaining module 1150 may communicate with receiving module 1152, transmitting module 1154, and measuring module 1156.

Receiving module 1152 may perform the receiving functions of wireless device 110. For example, receiving module 1152 may receive, from a network node, a reference signal as described in any of the embodiments or examples above (e.g., step 1616 of FIG. 16). In certain embodiments, receiving module 1152 may include or be included in processing circuitry 1120. In particular embodiments, receiving module 1152 may communicate with obtaining module 1150, transmitting module 1154, and measuring module 1156

Transmitting module 1154 may perform the transmitting functions of wireless device 110. For example, transmitting module 1154 may transmit a measurement report according to any of the examples described above (e.g., step 1620 of FIG. 16). In certain embodiments, transmitting module 1154 may include or be included in processing circuitry 1120. In particular embodiments, transmitting module 1154 may communicate with obtaining module 1150, receiving module 1152, and measuring module 1156.

Measuring module 1156 may perform the measuring functions of wireless device 110. For example, measuring module 1156 may measure a reference signal according to any of the examples described above (e.g., step 1618 of FIG. 16). In certain embodiments, measuring module 1156 may include or be included in processing circuitry 1120. In particular embodiments, measuring module 1156 may communicate with obtaining module 1150, receiving module 1152, and transmitting module 1154.

FIG. 19A is a block diagram illustrating an example embodiment of a network node. The network node is an example of the network node 120 illustrated in FIG. 7. In particular embodiments, the network node is capable of configuring a wireless device to measure reference signals for mobility in a wireless network. The network node is capable of obtaining a measurement configuration for measuring mobility signals in connected mode. The measurement configuration includes a reference signal type. The reference signal type indicates a particular type of reference signal of a plurality of possible reference signal types. The network node is capable of transmitting the measurement configuration to a wireless device, and transmitting the reference signal of the indicated reference signal type.

Network node 120 can be an eNodeB, a nodeB, gNB, a base station, a wireless access point (e.g., a Wi-Fi access point), a low power node, a base transceiver station (BTS), a transmission point or node, a remote RF unit (RRU), a remote radio head (RRH), or other radio access node. The network node includes at least one transceiver 1210, at least one processing circuitry 1220, at least one memory 1230, and at least one network interface 1240. Transceiver 1210 facilitates transmitting wireless signals to and receiving wireless signals from a wireless device, such as wireless devices 110 (e.g., via an antenna); processing circuitry 1220 executes instructions to provide some or all of the functionality described above as being provided by a network node 120; memory 1230 stores the instructions executed by processing circuitry 1220; and network interface 1240 communicates signals to backend network components, such as a gateway, switch, router, Internet, Public Switched Telephone Network (PSTN), controller, and/or other network nodes 120. Processing circuitry 1220 and memory 1230 can be of the same types as described with respect to processing circuitry 1120 and memory 1130 of FIG. 18A above.

In some embodiments, network interface 1240 is communicatively coupled to processing circuitry 1220 and refers to any suitable device operable to receive input for network node 120, send output from network node 120, perform suitable processing of the input or output or both, communicate to other devices, or any combination of the preceding. Network interface 1240 includes appropriate hardware (e.g., port, modem, network interface card, etc.) and software, including protocol conversion and data processing capabilities, to communicate through a network.

Other embodiments of network node 120 include additional components (beyond those shown in FIG. 19A) responsible for providing certain aspects of the network node's functionality, including any of the functionality described above and/or any additional functionality (including any functionality necessary to support the solution described above). The various different types of network nodes may include components having the same physical hardware but configured (e.g., via programming) to support different radio access technologies, or may represent partly or entirely different physical components.

FIG. 19B is a block diagram illustrating example components of network node 120. The components may include obtaining module 1250, determining module 1252, transmitting module 1254, and receiving module 1256.

Obtaining module 1250 may perform the obtaining functions of network node 120. For example, obtaining module 1250 may obtain a measurement configuration as described in any of the embodiments or examples above (e.g., step 1712 of FIG. 17). In certain embodiments, obtaining module 1250 may include or be included in processing circuitry 1220. In particular embodiments, obtaining module 1250 may communicate with determining module 1252, transmitting module 1254, and receiving module 1256.

Determining module 1252 may perform the determining functions of network node 120. For example, determining module 1252 may determine what type of reference signal to send wireless device 110 for active mode mobility measurements. In certain embodiments, determining module 1252 may include or be included in processing circuitry 1220. In particular embodiments, determining module 1252 may communicate with obtaining module 1250, transmitting module 1254, and receiving module 1256.

Transmitting module 1254 may perform the transmitting functions of network node 120. For example, transmitting module 1254 may transmit a reference signal and measurement configuration according to any of the examples described above (e.g., steps 1714 and 1716 of FIG. 17). In certain embodiments, transmitting module 1254 may include or be included in processing circuitry 1220. In particular embodiments, transmitting module 1254 may communicate with obtaining module 1250, determining module 1252, and receiving module 1256.

Receiving module 1256 may perform the receiving functions of network node 120. For example, receiving module 1256 may receive, from a wireless device, a measurement report as described in any of the embodiments or examples above (e.g., step 1712 of FIG. 17). In certain embodiments, receiving module 1256 may include or be included in processing circuitry 1220. In particular embodiments, receiving module 1256 may communicate with obtaining module 1250, determining module 1252, and transmitting module 1254.

Figure 20B:
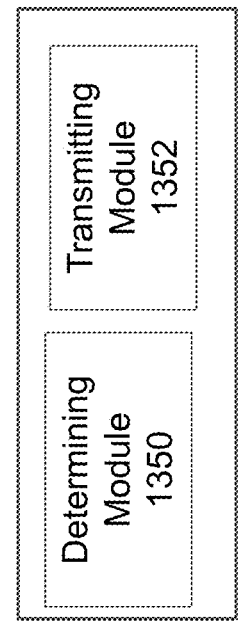
FIG. 20B is a block diagram illustrating example components of a core network node.
Figure 20A:
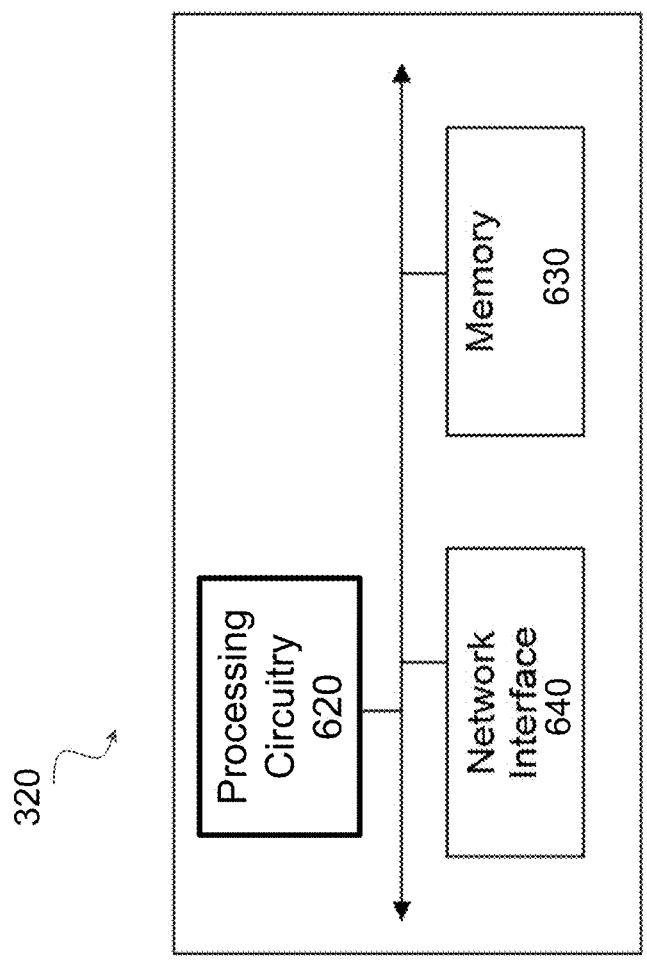
FIG. 20A is a block diagram illustrating an example embodiment of a core network node.

FIG. 20A is a block schematic of an example core network node 320, in accordance with certain embodiments. In particular embodiments, the core network node is capable of sending, to a network node, a measurement configuration.

Examples of core network nodes can include a mobile switching center (MSC), a serving GPRS support node (SGSN), a mobility management entity (MME), a radio network controller (RNC), a base station controller (BSC), an access and mobility management function (AMF), and so on. The core network node includes processing circuitry 620, memory 630, and network interface 640. In some embodiments, processing circuitry 620 executes instructions to provide some or all of the functionality described above as being provided by the network node, memory 630 stores the instructions executed by processing circuitry 620, and network interface 640 communicates signals to any suitable node, such as a gateway, switch, router, Internet, Public Switched Telephone Network (PSTN), network nodes 120, radio network controllers or core network nodes 320, etc.

Processing circuitry 620 may include any suitable combination of hardware and software implemented in one or more modules to execute instructions and manipulate data to perform some or all of the described functions of the core network node. In some embodiments, processing circuitry 620 may include, for example, one or more computers, one or more central processing units (CPUs), one or more microprocessors, one or more applications, and/or other logic.

Memory 630 is generally operable to store instructions, such as a computer program, software, an application including one or more of logic, rules, algorithms, code, tables, etc. and/or other instructions capable of being executed by a processor. Examples of memory 630 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 640 is communicatively coupled to processing circuitry 620 and may refer to any suitable device operable to receive input for the network node, send output from the network node, perform suitable processing of the input or output or both, communicate to other devices, or any combination of the preceding. Network interface 640 may include appropriate hardware (e.g., port, modem, network interface card, etc.) and software, including protocol conversion and data processing capabilities, to communicate through a network.

Other embodiments of the network node may include additional components beyond those shown in FIG. 20A that may be responsible for providing certain aspects of the network node's functionality, including any of the functionality described above and/or any additional functionality (including any functionality necessary to support the solution described above).

FIG. 20B is a block diagram illustrating example components of core network node 320. The components may include receiving module 1350 and transmitting module 1352.

Receiving module 1350 may perform the receiving functions of core network node 320. In certain embodiments, receiving module 1350 may include or be included in processing circuitry 620. In particular embodiments, receiving module 1350 may communicate with transmitting module 1352.

Transmitting module 1352 may perform the transmitting functions of core network node 320. For example, transmitting module 1352 may transmit a measurement configuration to a network node according to any of the examples described above. In certain embodiments, transmitting module 1352 may include or be included in processing circuitry 620. In particular embodiments, transmitting module 1352 may communicate with receiving module 1350.

Some embodiments of the disclosure may provide one or more technical advantages. Some embodiments may benefit from some, none, or all of these advantages. Other technical advantages may be readily ascertained by one of ordinary skill in the art. For example, some embodiments facilitate configuring active mode mobility (AMM) reference signals (RSs) and measurements, depending on deployment and usage scenario parameters, so that the resource usage is efficient while maintaining a required AMM performance level.

Although this disclosure has been described in terms of certain embodiments, alterations and permutations of the embodiments will be apparent to those skilled in the art. Although some embodiments have been described with reference to certain radio access technologies, any suitable radio access technology (RAT) or combination of radio access technologies may be used, such as long term evolution (LTE), LTE-Advanced, NR, UMTS, HSPA, GSM, cdma2000, WiMax, WiFi, etc. Accordingly, the above description of the embodiments does not constrain this disclosure. Other changes, substitutions, and alterations are possible without departing from the spirit and scope of this disclosure.

Abbreviations

3GPP 3rd Generation Partnership Project
AIT Access Information Table
ANR Automatic Neighbor Relation
CA Carrier Aggregation
CC Component Carrier
CRS Cell-specific Reference Signal
D2D Device to Device
DRS Discovery Reference Signal
DTX Discontinuous Transmission
eNB Evolved Node B
eNodeB Evolved Node B
FDD Frequency Division Duplex
LTE Long-Term Evolution
MIB Master Information Block
MRS Mobility Reference Signal
MTC Machine Type Communication
NR New Radio
PBCH Physical Broadcast Channel
PCC Primary Component Carrier
PCell Primary Cell
RAT Radio Access Technology
RBS Radio Base Station
RRC Radio Resource Control
RRM Radio Resource Measurement
RSRP Reference Signal Received Power
RSRQ Reference Signal Received Quality
SCC Secondary Component Carrier
SCell Secondary Cell
SFN Single Frequency Network
SINR Signal to Interference and Noise Ratio
TDD Time Division Duplex
TRP Transmission/Reception Point
UE User Equipment
UMTS Universal Mobile Telecommunications System

The invention claimed is:

1. A method for use in a wireless device of performing radio resource management (RRM) measurements for mobility in a wireless network, the method comprising:
   obtaining a measurement configuration for measuring mobility signal beams while the wireless device is in connected mode, the measurement configuration including a reference signal type, the reference signal type indicating a particular type of reference signal of a plurality of possible reference signal types, wherein the plurality of possible reference signal types comprises active mode and idle mode signals;
   configuring the wireless device to measure a reference signal of the indicated reference signal type for one or more beams while the wireless device is in connected mode;
   upon the indicated reference signal type being an idle mode signal, receiving the one or more beams of the idle mode reference signal of the indicated reference signal type while the wireless device is in connected mode; and measuring the idle mode reference signal of the one or more beams according to the measurement configuration while the wireless device is in connected mode.

2. The method of claim 1, wherein the idle mode reference signals include at least one of a primary synchronization signal (PSS), a secondary synchronization signal (SSS), and a demodulation reference signal (DMRS).

3. The method of claim 1, wherein the measurement configuration includes a configuration for non-beamformed or wide-beam reception of the idle mode reference signals.

4. The method of claim 1, wherein the measurement configuration includes a configuration for beam-swept reception of the idle mode reference signals.

5. The method of claim 1, wherein the measurement configuration includes a configuration for beam-swept reception of the idle mode reference signal.

6. The method of claim 5, wherein the idle mode reference signal comprises a beam identifier.

7. The method of claim 6, wherein the idle mode reference signal further comprises a cell identifier.

8. The method of claim 1, further comprising:
sending a measurement report based on the received idle mode reference signal to a network node; and
performing a handover.

9. The method of claim 1, further comprising:
obtaining a second measurement configuration for measuring mobility signals in connected mode, the second measurement configuration including a second reference signal type, the second reference signal type indicating a particular type of reference signal of the plurality of possible reference signal types;
configuring the wireless device to measure a second reference signal of the second indicated reference signal type;
receiving the second reference signal of the second indicated reference signal type; and
measuring the second reference signal according to the second measurement configuration.

10. A wireless device capable of performing radio resource management (RRM) measurements for mobility in a wireless network, the wireless device comprising processing circuitry configured to:
obtain a measurement configuration for measuring mobility signal beams while the wireless device is in connected mode, the measurement configuration including a reference signal type, the reference signal type indicating a particular type of reference signal of a plurality of possible reference signal types, wherein the plurality of possible reference signal types comprises active mode and idle mode signals;
configure the wireless device to measure a reference signal of the indicated reference signal type for one or more beams while the wireless device is in connected mode;
upon the indicated reference signal type being an idle mode signal, receive the for one or more beams of the idle mode reference signal of the indicated reference signal type while the wireless device is in connected mode; and
measure the idle mode reference signal of the one or more beams according to the measurement configuration while the wireless device is in connected mode.

11. The wireless device of claim 10, wherein the idle mode reference signals include at least one of a primary synchronization signal (PSS), a secondary synchronization signal (SSS), and a demodulation reference signal (DMRS).

12. The wireless device of claim 10, wherein the measurement configuration includes a configuration for non-beamformed or wide-beam reception of the idle mode reference signals.

13. The wireless device of claim 10, wherein the measurement configuration includes a configuration for beam-swept reception of the idle mode reference signals.

14. The wireless device of claim 10, wherein the measurement configuration includes a configuration for beam-swept reception of the idle mode reference signal.

15. The wireless device of claim 14, wherein the idle mode reference signal comprises a beam identifier.

16. The wireless device of claim 15, wherein the idle mode reference signal further comprises a cell identifier.

17. The wireless device of claim 10, the processing circuitry further configured to:
send a measurement report based on the received idle mode reference signal to a network node; and
perform a handover.

18. The wireless device of claim 10, the processing circuitry further configured to:
obtain a second measurement configuration for measuring mobility signals in connected mode, the second measurement configuration including a second reference signal type, the second reference signal type indicating a particular type of reference signal of the plurality of possible reference signal types;
configure the wireless device to measure a second reference signal of the second indicated reference signal type;
receive the second reference signal of the second indicated reference signal type; and
measure the second reference signal according to the second measurement configuration.

19. A method for use in a network node of configuring a wireless device to measure reference signals for mobility in a wireless network, the method comprising:
obtaining a measurement configuration for measuring mobility signal beams while the wireless device is in connected mode, the measurement configuration including a reference signal type, the reference signal type indicating a particular type of reference signal of a plurality of possible reference signal types, wherein the plurality of possible reference signal types comprises active mode and idle mode signals;
transmitting the measurement configuration to a wireless device;
while the wireless device is in connected mode, transmitting one or more beams of the idle mode reference signal of the indicated reference signal type; and
receiving from the wireless device in connected mode a measurement report based on measurements of the idle mode reference signal.

20. A network node capable of configuring a wireless device to measure reference signals for mobility in a wireless network, the network node comprising processing circuitry configured to:
obtain a measurement configuration for measuring mobility signal beams while the wireless device is in connected mode, the measurement configuration including a reference signal type, the reference signal type indicating a particular type of reference signal of a plurality of possible reference signal types, wherein the plurality of possible reference signal types comprises active mode and idle mode signals;
transmit the measurement configuration to a wireless device;

while the wireless device is in connected mode transmit one or more beams of the idle mode reference signal of the indicated reference signal type; and receiving from the wireless device in connected mode a measurement report based on measurements of the idle mode reference signal.

\* \* \* \* \*

UNITED STATES PATENT AND TRADEMARK OFFICE
CERTIFICATE OF CORRECTION

| | |
|---|---|
| PATENT NO. | : 10,681,599 B2 |
| APPLICATION NO. | : 16/216281 |
| DATED | : June 9, 2020 |
| INVENTOR(S) | : Da Silva et al. |

It is certified that error appears in the above-identified patent and that said Letters Patent is hereby corrected as shown below:

In the Claims

In Column 28, Line 46, delete "a" and insert -- the --, therefor.

Signed and Sealed this
Third Day of May, 2022

Katherine Kelly Vidal
*Director of the United States Patent and Trademark Office*